United States Patent
Garrett et al.

(10) Patent No.: US 6,760,511 B2
(45) Date of Patent: Jul. 6, 2004

(54) RECONFIGURABLE OPTICAL ADD-DROP MULTIPLEXERS EMPLOYING POLARIZATION DIVERSITY

(75) Inventors: Mark H. Garrett, Morgan Hill, CA (US); Masud Mansuripur, Tucson, AZ (US); Jeffrey P. Wilde, Morgan Hill, CA (US); Pavel G. Polynkin, Fremont, CA (US)

(73) Assignee: Capella Photonics, Inc., San Jose, CA (US)

( * ) Notice: Subject to any disclaimer, the term of this patent is extended or adjusted under 35 U.S.C. 154(b) by 264 days.

(21) Appl. No.: 10/076,145

(22) Filed: Feb. 14, 2002

(65) Prior Publication Data

US 2002/0131691 A1 Sep. 19, 2002

Related U.S. Application Data

(63) Continuation-in-part of application No. 09/938,426, filed on Aug. 23, 2001.
(60) Provisional application No. 60/277,217, filed on Mar. 19, 2001.

(51) Int. Cl.$^7$ .............................................. G02B 6/28
(52) U.S. Cl. ............................. 385/24; 385/11; 385/37; 385/34
(58) Field of Search ........................ 385/11, 37, 24, 385/34

(56) References Cited

U.S. PATENT DOCUMENTS 5,629,790 A    5/1997  Neukermans et al.
5,868,480 A  * 2/1999  Zeinali ........................ 353/31
5,960,133 A    9/1999  Gilbert
5,974,207 A   10/1999  Aksyuk et al.
6,172,777 B1 * 1/2001  Flood et al. .................. 359/10
6,193,376 B1 * 2/2001  Hayashi et al. ............... 353/30
6,204,946 B1   3/2001  Aksyuk et al.
6,205,269 B1   3/2001  Morton
6,263,135 B1 * 7/2001  Wade .......................... 359/130
6,289,155 B1 * 9/2001  Wade .......................... 385/33
6,343,862 B1 * 2/2002  Sawai et al. .................. 351/1
6,418,250 B1 * 7/2002  Corbosiero et al. ......... 359/124

* cited by examiner

Primary Examiner—Hung N. Ngo
(74) Attorney, Agent, or Firm—Gray Cary Ware & Freidenrich LLP

(57) ABSTRACT

This invention provides a novel wavelength-separating-routing (WSR) apparatus that uses a diffraction grating to separate a multi-wavelength optical signal by wavelength into multiple spectral channels, which are focused onto an array of corresponding channel micromirrors. The channel micromirrors are individually controllable and continuously pivotable to reflect the spectral channels into selected output ports. As such, the inventive WSR apparatus is capable of routing the spectral channels on a channel-by-channel basis and coupling any spectral channel into any one of the output ports. The WSR apparatus of the invention may further employ a polarization diversity scheme, whereby polarization-sensitive effects become inconsequential and insertion loss is minimized. The WSR apparatus of the invention may additionally be equipped with servo-control and channel equalization capabilities. The WSR apparatus of the invention can be used to construct a novel class of dynamically reconfigurable optical add-drop multiplexers (OADMs) for WDM optical networking applications.

28 Claims, 19 Drawing Sheets

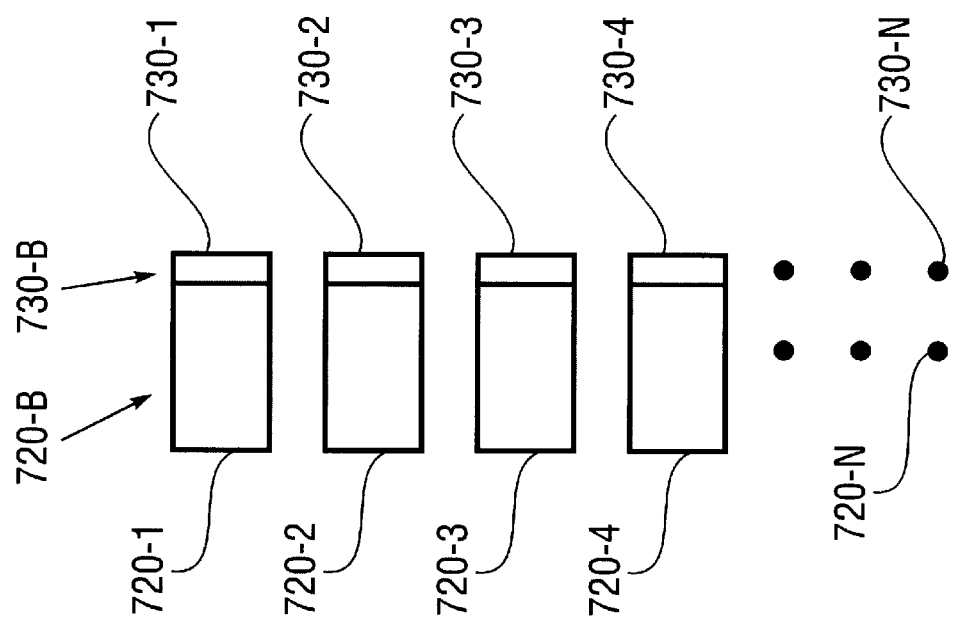

RECONFIGURABLE OPTICAL ADD-DROP MULTIPLEXERS EMPLOYING POLARIZATION DIVERSITY

CROSS-REFERENCE TO RELATED APPLICATIONS

This application is a continuation-in-part of U.S. patent application Ser. No. 09/938,426, filed on Aug. 23, 2001, and which claims priority from U.S. Provisional Patent Application Ser. No. 60/277,217, filed on Mar. 19, 2001.

BACKGROUND

This invention relates generally to optical communication systems. More specifically, it relates to a novel class of dynamically reconfigurable optical add-drop multiplexers (OADMs) for wavelength division multiplexed optical networking applications.

As fiber-optic communication networks rapidly spread into every walk of modern life, there is a growing demand for optical components and subsystems that enable the fiber-optic communications networks to be increasingly scalable, versatile, robust, and cost-effective.

Contemporary fiber-optic communications networks commonly employ wavelength division multiplexing (WDM), for it allows multiple information (or data) channels to be simultaneously transmitted on a single optical fiber by using different wavelengths and thereby significantly enhances the information bandwidth of the fiber. The prevalence of WDM technology has made optical add-drop multiplexers indispensable building blocks of modern fiber-optic communication networks. An optical add-drop multiplexer (OADM) serves to selectively remove (or drop) one or more wavelengths from a multiplicity of wavelengths on an optical fiber, hence taking away one or more data channels from the traffic stream on the fiber. It further adds one or more wavelengths back onto the fiber, thereby inserting new data channels in the same stream of traffic. As such, an OADM makes it possible to launch and retrieve multiple data channels (each characterized by a distinct wavelength) onto and from an optical fiber respectively, without disrupting the overall traffic flow along the fiber. Indeed, careful placement of the OADMs can dramatically improve an optical communication network's flexibility and robustness, while providing significant cost advantages.

Conventional OADMs in the art typically employ multiplexers/demultiplexers (e.g, waveguide grating routers or arrayed-waveguide gratings), tunable filters, optical switches, and optical circulators in a parallel or serial architecture to accomplish the add and drop functions. In the parallel architecture, as exemplified in U.S. Pat. No. 5,974,207, a demultiplexer (e.g., a waveguide grating router) first separates a multi-wavelength signal into its constituent spectral components. A wavelength switching/routing means (e.g., a combination of optical switches and optical circulators) then serves to drop selective wavelengths and add others. Finally, a multiplexer combines the remaining (i.e., the pass-through) wavelengths into an output multi-wavelength optical signal. In the serial architecture, as exemplified in U.S. Pat. No. 6,205,269, tunable filters (e.g., Bragg fiber gratings) in combination with optical circulators are used to separate the drop wavelengths from the pass-through wavelengths and subsequently launch the add channels into the pass-through path. And if multiple wavelengths are to be added and dropped, additional multiplexers and demultiplexers are required to demultiplex the drop wavelengths and multiplex the add wavelengths, respectively.

Irrespective of the underlying architecture, the OADMs currently in the art are characteristically high in cost, and prone to significant optical loss accumulation. Moreover, the designs of these OADMs are such that it is inherently difficult to reconfigure them in a dynamic fashion.

U.S. Pat. No. 6,204,946 to Askyuk et al. discloses an OADM that makes use of free-space optics in a parallel construction. In this case, a multi-wavelength optical signal emerging from an input port is incident onto a ruled diffraction grating. The constituent spectral channels thus separated are then focused by a focusing lens onto a linear array of binary micromachined mirrors. Each micromirror is configured to operate between two discrete states, such that it either retroreflects its corresponding spectral channel back into the input port as a pass-through channel, or directs its spectral channel to an output port as a drop channel. As such, the pass-through signal (i.e., the combined pass-through channels) shares the same input port as the input signal. An optical circulator is therefore coupled to the input port, to provide necessary routing of these two signals. Likewise, the drop channels share the output port with the add channels. An additional optical circulator is thereby coupled to the output port, from which the drop channels exit and the add channels are introduced into the output port. The add channels are subsequently combined with the pass-through signal by way of the diffraction grating and the binary micromirrors.

Although the aforementioned OADM disclosed by Askyuk et al. has the advantage of performing wavelength separating and routing in free space and thereby incurring less optical loss, it suffers a number of limitations. First, it requires that the pass-through signal share the same port/fiber as the input signal. An optical circulator therefore has to be implemented, to provide necessary routing of these two signals. Likewise, all the add and drop channels enter and leave the OADM through the same output port, hence the need for another optical circulator. Moreover, additional means must be provided to multiplex the add channels before entering the system and to demultiplex the drop channels after exiting the system. This additional multiplexing/demultiplexing requirement adds more cost and complexity that can restrict the versatility of the OADM thus-constructed. Second, the optical circulators implemented in this OADM for various routing purposes introduce additional optical losses, which can accumulate to a substantial amount. Third, the constituent optical components must be in a precise alignment, in order for the system to achieve its intended purpose. There are, however, no provisions provided for maintaining the requisite alignment; and no mechanisms implemented for overcoming degradation in the alignment owing to environmental effects such as thermal and mechanical disturbances over the course of operation.

U.S. Pat. No. 5,906,133 to Tomlinson discloses an OADM that makes use of a design similar to that of Aksyuk et al. There are input, output, drop and add ports implemented in this case. By positioning the four ports in a specific arrangement, each micromirror (being switchable between two discrete positions) either reflects its corresponding channel (coming from the input port) to the output port, or concomitantly reflects its channel to the drop port and an incident add channel to the output port. As such, this OADM is able to perform both the add and drop functions without involving additional optical components (such as optical circulators used in the system of Aksyuk et al.). However, because a single drop port is designated for all the drop channels and a single add port is designated for all the add channels, the add channels would have to be multiplexed before entering the add port and the drop channels likewise need to be demultiplexed upon exiting from the drop port. Moreover, as in the case of Askyuk et al., there are no provisions provided for maintaining requisite optical alignment in the system, and no mechanisms implemented for combating degradation in the alignment due to environmental effects over the course of operation.

As such, the prevailing drawbacks suffered by the OADMs currently in the art are summarized as follows:

1) The wavelength routing is intrinsically static, rendering it difficult to dynamically reconfigure these OADMs.
2) Add and/or drop channels often need to be multiplexed and/or demultiplexed, thereby imposing additional complexity and cost.
3) Stringent fabrication tolerance and painstaking optical alignment are required.

Moreover, the optical alignment is not actively maintained, rendering it susceptible to environmental effects such as thermal and mechanical disturbances over the course of operation.

4) In an optical communication network, OADMs are typically in a ring or cascaded configuration. In order to mitigate the interference amongst OADMs, which often adversely affects the overall performance of the network, it is essential that the optical power levels of spectral channels entering and exiting each OADM be managed in a systematic way, for instance, by introducing power (or gain) equalization at each stage. Such a power equalization capability is also needed for compensating for non-uniform gain caused by optical amplifiers (e.g., erbium doped fiber amplifiers) in the network. There lacks, however, a systematic and dynamic management of the optical power levels of various spectral channels in these OADMs.
5) The inherent high cost and optical loss further impede the wide application of these OADMs.

In view of the foregoing, there is an urgent need in the art for optical add-drop multiplexers that overcome the aforementioned shortcomings in a simple, effective, and economical construction.

SUMMARY OF THE INVENTION

The invention provides a polarization diversity wavelength-separating-routing (WSR) apparatus and method which minimizes insertion loss and polarization-dependent loss (PDL).

In WSR apparatus with which the invention may be used, a multi-wavelength optical signal is provided from an input port to a wavelength-separator which separates the multi-wavelength optical signal by wavelength into multiple spectral channels. Each channel may be characterized by a distinct center wavelength and associated bandwidth. A beam-focuser may focus the spectral channels into corresponding spots onto a plurality of channel micromirrors positioned such that each channel micromirror receives one of the spectral channels. The channel micromirrors are individually controllable and movable, e.g., continuously pivotable or rotatable, so as to reflect the spectral channels into selected ones of the output ports. Each output port may receive any number of the reflected spectral channels.

In one aspect, the WSR apparatus of the invention employs a polarization diversity arrangement to overcome polarization-sensitive effects the constituent optical elements may possess. A polarization-displacing unit and a polarization-rotating unit may be disposed along the optical path between the fiber collimators providing the input and output ports and the wavelength-separator which separates the input multi-wavelength optical signal into the constituent wavelengths. The polarization-displacing unit decomposes the input multi-wavelength optical signal into first and second polarization components. The polarization-rotating unit may subsequently rotate the polarization of the second polarization component so that its polarization is substantially parallel to the first polarization component, e.g., by 90-degrees. The wavelength-separator separates the incident optical signals by wavelength into first and second sets of optical beams, respectively. The beam-focuser may focus the first and second sets of optical beams into corresponding focused spots, impinging onto the channel micromirrors. The first and second optical beams associated with the same wavelength may impinge onto (and be manipulated by) the same channel micromirror. The channel micromirrors may be individually controlled such that the first and second sets of optical beams are deflected, upon reflection. The reflected first set of optical beams may subsequently undergo a rotation in polarization by, e.g., 90 degrees, by the polarization-rotating unit. This enables the polarization-displacing unit to recombine the reflected first and second sets of optical beams by wavelength respectively into reflected spectral channels, prior to being coupled into the output ports.

The polarization-displacing unit may comprise one or more polarization-displacing elements, each being a birefringent beam displacer, or a polarizing-beam-splitting element, e.g., a polarizing beam splitter in conjunction with a suitable beam-reflector. The polarization-rotating unit may include one or more polarization rotating elements, each being a half-wave plate, a Faraday rotator, or a liquid crystal rotator known in the art.

A distinct feature of the channel micromirrors in the WSR apparatus is that the motion of each channel micromirror is under analog control such that its pivoting angle can be continuously adjusted. This enables each channel micromirror to scan its corresponding spectral channel across all possible output ports and thereby direct the spectral channel to any desired output port.

In the WSR apparatus, the wavelength-separator may be a ruled diffraction grating, a holographic diffraction grating, an echelle grating, a curved diffraction grating, a transmission grating, a dispersing prism, or other wavelength-separating means known in the art. The beam-focuser may be a single lens, an assembly of lenses, or other beam-focusing means known in the art. The channel micromirrors may be silicon micromachined mirrors, reflective ribbons (or membranes), or other types of beam-deflecting means known in the art. Each channel micromirror may be pivotable about one or two axes. Fiber collimators serving as the input and output ports may be arranged in a one-dimensional or two-dimensional array. In the latter case, the channel micromirrors may be pivotable biaxially.

In another aspect, the WSR apparatus of the invention may comprise an array of collimator-alignment mirrors, in optical communication with the wavelength-separator and the fiber collimators, for adjusting the alignment of the input multi-wavelength signal and for directing the spectral channels into the selected output ports by way of angular control of the collimated beams. Each collimator-alignment mirror may be rotatable about one or two axes. The collimator-alignment mirrors may be arranged in a one-dimensional or two-dimensional array. First and second arrays of imaging lenses may additionally be optically interposed between the collimator-alignment mirrors and the fiber collimators such that the collimator-alignment mirrors are effectively "imaged" onto the corresponding fiber collimators to ensure an optimal alignment.

In another aspect, the WSR apparatus of the invention may include a servo-control assembly, in communication with the channel micromirrors and the output ports. The servo-control assembly serves to monitor the optical power levels of the spectral channels coupled into the output ports and further provide control of the channel micromirrors on an individual basis, so as to maintain a predetermined coupling efficiency of each spectral channel into one of the output ports. As such, the servo-control assembly provides dynamic control of the coupling of the spectral channels into the respective output ports and actively manages the optical power levels of the spectral channels coupled into the output ports. (If the WSR apparatus includes an array of collimator-alignment mirrors as described above, the servo-control assembly may additionally provide dynamic control of the collimator-alignment mirrors.) Moreover, the utilization of such a servo-control assembly effectively relaxes the requisite fabrication tolerances and the precision of optical alignment during assembly of a SR apparatus of the invention, and further enables the system to correct for shift in optical alignment over the course of operation. A WSR apparatus incorporating a servo-control assembly thus described is termed a WSR-S apparatus, in the following discussion.

The WSR apparatus of the invention affords a variety of optical devices, including a novel class of dynamically reconfigurable optical add-drop multiplexers (OADMs), that provide many advantages over the prior art devices, notably:

1) By advantageously employing an array of channel micromirrors that are individually and continuously controllable, an OADM of the invention is capable of routing the spectral channels on a channel-by-channel basis and directing any spectral channel into any one of the output ports. As such, its underlying operation is dynamically reconfigurable, and its underlying architecture is intrinsically scalable to a large number of channel counts.

2) The add and drop spectral channels need not be multiplexed and demultiplexed before entering and after leaving the OADM respectively. And there are not fundamental restrictions on the wavelengths to be added or dropped.

3) The coupling of the spectral channels into the output ports is dynamically controlled by a servo-control assembly, rendering the OADM less susceptible to environmental effects (such as thermal and mechanical disturbances) and therefore more robust in performance. By maintaining an optimal optical alignment, the optical losses incurred by the spectral channels are also significantly reduced.

4) The optical power levels of the spectral channels coupled into the output ports can be dynamically managed according to demand, or maintained at desired values (e.g., equalized at a predetermined value) by way of the servo-control assembly. This spectral power-management capability as an integral part of the OADM will be particularly desirable in WDM optical networking applications.

5) The use of free-space optics provides a simple, low loss, and cost-effective construction. Moreover, the utilization of the servo-control assembly effectively relaxes the requisite fabrication tolerances and the precision of optical alignment during initial assembly, enabling the OADM to be simpler and more adaptable in structure, and lower in cost and optical loss.

6) The use of a polarization diversity scheme renders the polarization-sensitive effects inconsequential in the OADM. This enables the OADM to minimize the insertion loss; and enhance spectral resolution in a simple and cost-effective construction (e.g., by making use of high-dispersion diffraction grating commonly available in the art). The polarization diversity scheme further allows the overall optical paths of the two polarization components for each spectral channel to be substantially equalized, thereby minimizing the polarization-dependent loss. Such attributes would be particularly desirable in WDM optical networking applications.

BRIEF DESCRIPTION OF THE DRAWINGS

FIGS. 7C–7D depict two exemplary embodiments of a polarization-displacing unit that may be used in the WSR apparatus shown in FIGS. 7A–7B;

DETAILED DESCRIPTION

In this specification and appended claims, a "spectral channel" is characterized by a distinct center wavelength and associated bandwidth. Each spectral channel may carry a unique information signal, as in WDM optical networking applications.

Figure 1A:
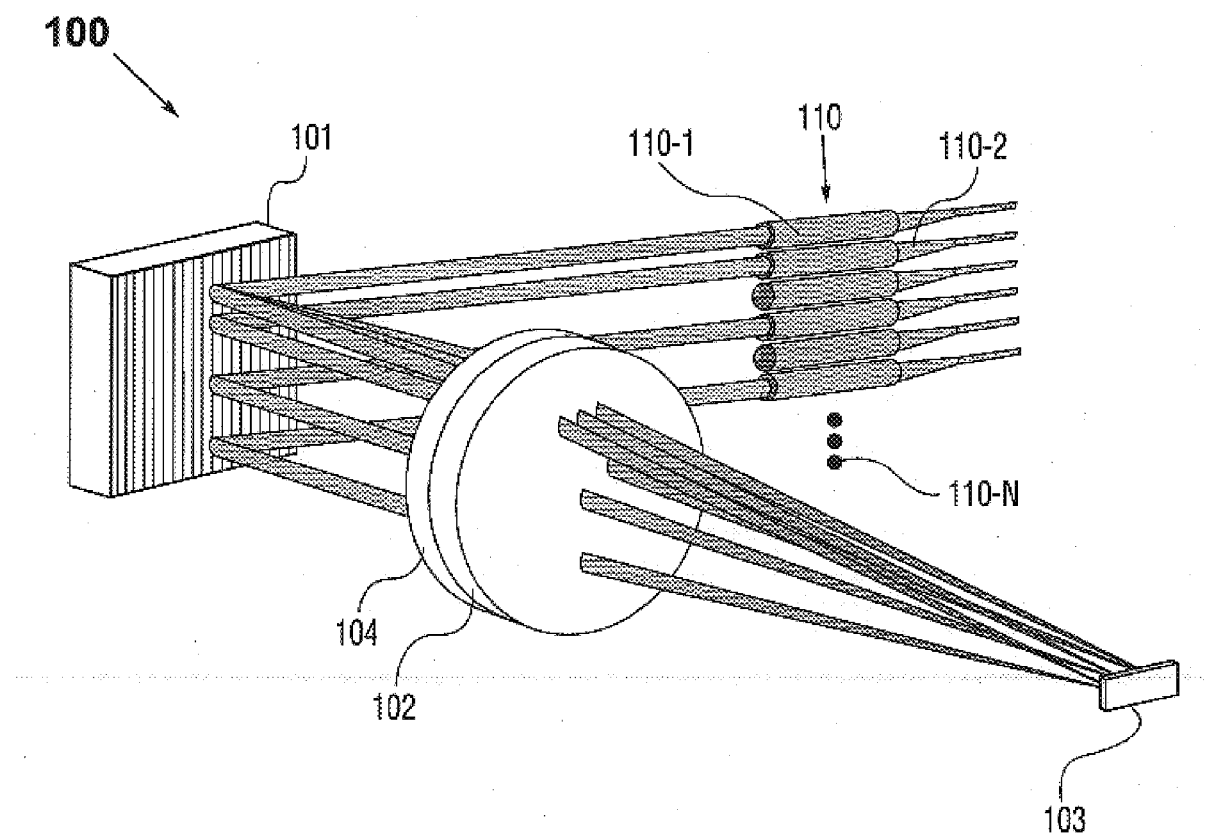
FIGS. 1A–1D show a first embodiment of a wavelength-separating-routing (WSR) apparatus with which the invention may be employed, and the modeling results demonstrating the performance of the WSR apparatus.

FIG. 1A depicts a first embodiment of a wavelength-separating-routing (WSR) apparatus with which the invention may be employed. By way of example to illustrate the general principles and the topological structure of a wavelength-separating-routing (WSR) apparatus of the invention, the WSR apparatus 100 comprises multiple input/output ports which may be in the form of an array of fiber collimators 110, providing an input port 110-1 and a plurality of output ports 110-2 through 110-N (N≧3); a wavelength-separator which in one form may be a diffraction grating 101; a beam-focuser in the form of a focusing lens 102; and an array of channel micromirrors 103.

In operation, a multi-wavelength optical signal emerges from the input port collimator 110-1. The diffraction grating 101 angularly separates the multi-wavelength optical signal into multiple spectral channels, which are in turn focused by the focusing lens 102 into a spatial array of distinct spectral spots (not shown in FIG. 1A) in a one-to-one correspondence. The channel micromirrors 103 are positioned in accordance with the spatial array formed by the spectral spots, such that each channel micromirror receives one of the spectral channels. The channel micromirrors 103 are individually controllable and movable, e.g., pivotable (or rotatable) under analog (or continuous) control, such that, upon reflection, the spectral channels are directed into selected ones of the output ports 110-2 through 110-N by way of the focusing lens 102 and the diffraction grating 101. As such, each channel micromirror is assigned to a specific spectral channel, hence the name "channel micromirror". Each output port may receive any number of the reflected spectral channels.

For purposes of illustration and clarity, only a select few, e.g., three, of the spectral channels, along with the input multi-wavelength optical signal, are graphically illustrated in FIG. 1A and the following figures. It should be noted, however, that there can be any number of the spectral channels in a WSR apparatus of the invention (so long as the number of spectral channels does not exceed the number of channel mirrors employed in the system). It should also be noted that the optical beams representing the spectral channels shown in FIG. 1A and the following figures are provided for illustrative purpose only. That is, their sizes and shapes may not be drawn according to scale. For instance, the input beam and the corresponding diffracted beams generally have different cross-sectional shapes, so long as the angle of incidence upon the diffraction grating is not equal to the angle of diffraction, as is known to those skilled in the art.

In the embodiment of FIG. 1A, it is preferable that the diffraction grating 101 and the channel micromirrors 103 are placed respectively at the first and second, i.e., the front and back, focal planes (on the opposing sides) of the focusing lens 102. Such a telecentric arrangement allows the chief rays of the focused beams to be parallel to each other and generally parallel to the optical axis. This telecentric configuration further allows the reflected spectral channels to be efficiently coupled into the respective output ports, thereby minimizing various translational walk-off effects that may otherwise arise. Moreover, the input multi-wavelength optical signal is preferably collimated and circular in cross-section.

The corresponding spectral channels diffracted from the diffraction grating 101 are generally elliptical in cross-section; they may be of the same size as the input beam in one dimension and elongated in the other dimension.

It is known that the diffraction efficiency of a diffraction grating is generally polarization-dependent. That is, the diffraction efficiency of a grating in a standard mounting configuration may be considerably higher for P-polarization that is perpendicular to the groove lines on the grating than for S-polarization that is orthogonal to P-polarization, especially as the number of groove lines (per unit length) increases. To mitigate such polarization-sensitive effects, a quarter-wave plate 104 may be optically interposed between the diffraction grating 101 and the channel micromirrors 103, and preferably placed between the diffraction grating 101 and the focusing lens 102 as is shown in FIG. 1A. In this way, each spectral channel experiences a total of approximately 90-degree rotation in polarization upon traversing the quarter-wave plate 104 twice. (That is, if a beam of light has P-polarization when first encountering the diffraction grating, it would have predominantly (if not all) S-polarization upon the second encountering, and vice versa.) This ensures that all the spectral channels incur nearly the same amount of round-trip polarization dependent loss.

Figure 1B:
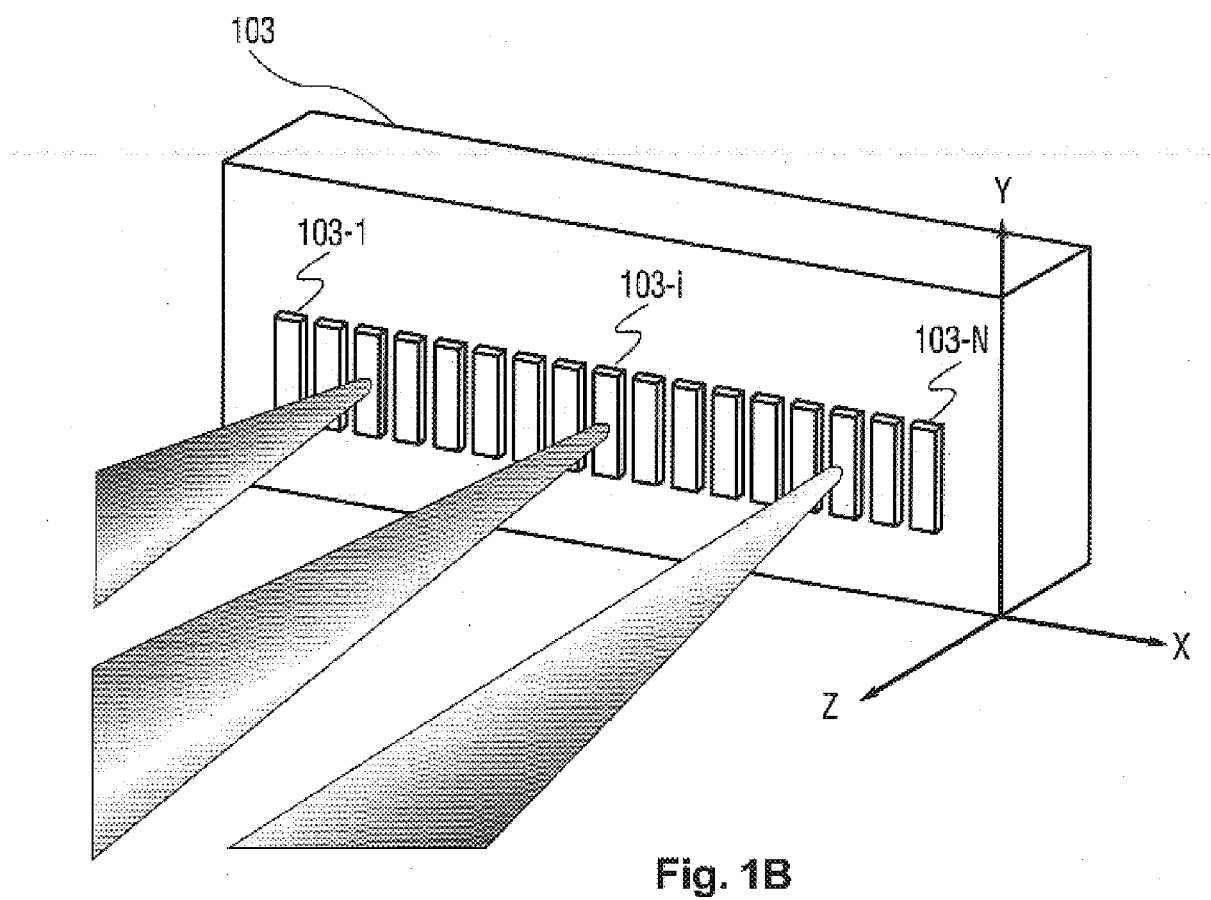

In the WSR apparatus 100 of FIG. 1A, the diffraction grating 101, by way of example, is oriented such that the focused spots of the spectral channels fall onto the channel micromirrors 103 in a horizontal array, as illustrated in FIG. 1B.

FIG. 1B is a close-up view of the channel micromirrors 103 shown in the embodiment of FIG. 1A. By way of example, the channel micromirrors 103 are arranged in a one-dimensional array along the x-axis (i.e., the horizontal direction in the figure), so as to receive the focused spots of the spatially separated spectral channels in a one-to-one correspondence. (As in the case of FIG. 1A, only three spectral channels are illustrated, each represented by a converging beam.) The reflective surface of each channel micromirror lies in the x-y plane as defined in the figure and is movable, e.g., pivotable or deflectable about an axis along the x-direction in an analog, i.e., continuous, manner. Each spectral channel, upon reflection, is deflected in the y-direction, e.g., downward, relative to its incident direction, so as to be directed into one of the output ports 110-2 through 110-N shown in FIG. 1A.

Figure 1C:
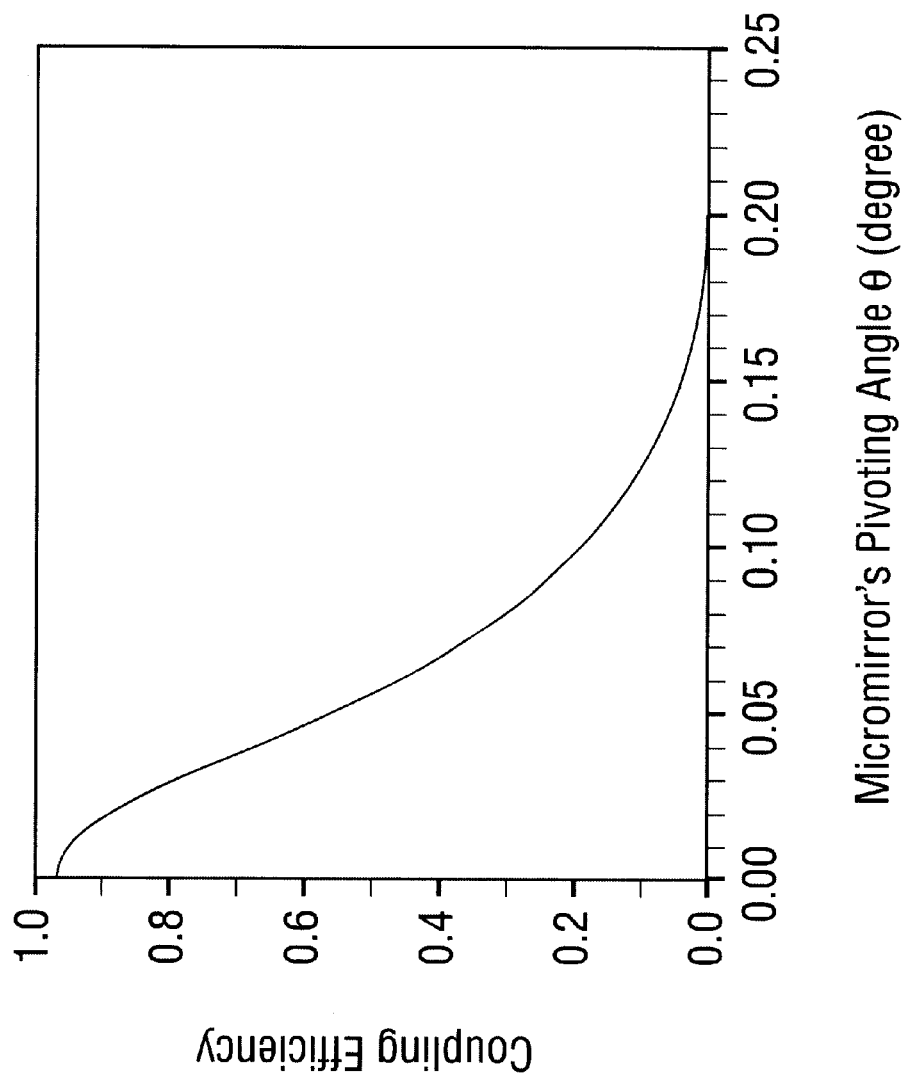
Figure 1D:
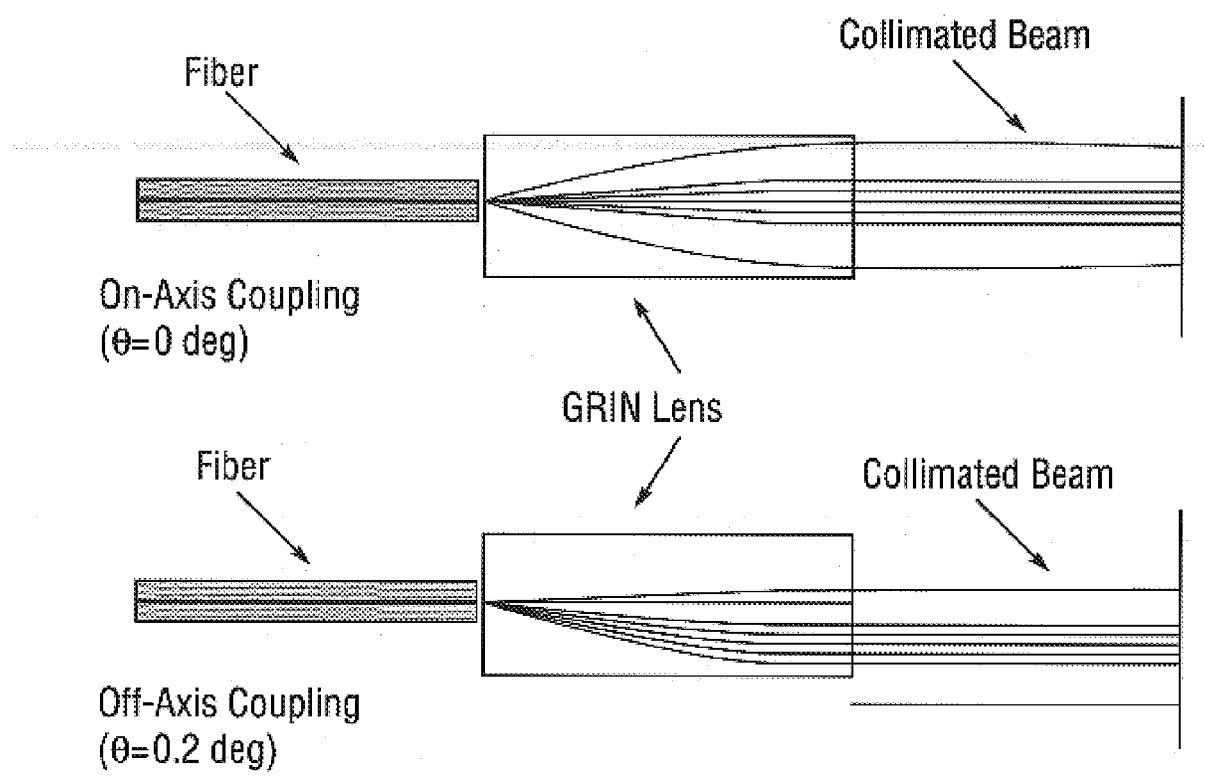

As described above, a unique feature of the invention is that the motion of each channel micromirror is individually and continuously controllable, such that its position, e.g., pivoting angle, can be continuously adjusted. This enables each channel micromirror to scan its corresponding spectral channel across all possible output ports and thereby direct the spectral channel to any desired output port. To illustrate this capability, FIG. 1C shows a plot of coupling efficiency as a function of a channel micromirror's pivoting angle $\theta$, provided by a ray-tracing model of a WSR apparatus in the embodiment of FIG. 1A. As used herein, the coupling efficiency for a spectral channel is defined as the ratio of the amount of optical power coupled into the fiber core in an output port to the total amount of optical power incident upon the entrance surface of the fiber (associated with the fiber collimator serving as the output port). In the ray-tracing model, the input optical signal is incident upon a diffraction grating with 700 lines per millimeter at a grazing angle of 85 degrees, where the grating is blazed to optimize the diffraction efficiency for the "−1" order. The focusing lens has a focal length of 100 mm. Each output port is provided by a quarter-pitch GRIN lens, e.g., 2 mm in diameter, coupled to an optical fiber (see FIG. 1D). As displayed in FIG. 1C, the coupling efficiency varies with the pivoting angle $\theta$, and it requires about a 0.2-degree change in $\theta$ for the coupling efficiency to become practically negligible in this exemplary case. As such, each spectral channel may practically acquire any coupling efficiency value by way of controlling the pivoting angle of its corresponding channel micromirror. This is also to say that variable optical attenuation at the granularity of a single wavelength can be obtained in a WSR apparatus of the invention. FIG. 1D provides ray-tracing illustrations of two extreme points on the coupling efficiency vs. θ curve of FIG. 1C: on-axis coupling corresponding to θ=0, where the coupling efficiency is maximum; and off-axis coupling corresponding to θ=0.2 degrees, where the representative collimated beam (representing an exemplary spectral channel) undergoes a significant translational walk-off and renders the coupling efficiency practically negligible. The exemplary modeling results thus described demonstrate the unique capabilities of the WSR apparatus of the invention.

FIG. 1A is but one of many embodiments of a WSR apparatus with which the invention may be used. In general, the wavelength-separator is a wavelength-separating means that may be a ruled diffraction grating, a holographic diffraction grating, an echelle grating, a dispersing prism, or other types of spectral-separating means known in the art. The beam-focuser may be a focusing lens, an assembly of lenses, or other beam-focusing means known in the art. The focusing function may also be accomplished by using a curved diffraction grating as the wavelength-separator. The channel micromirrors may be provided by silicon micromachined mirrors, reflective ribbons (or membranes), or other types of beam-deflecting elements known in the art. Each micromirror may be pivoted about one or two axes. It is important that the pivoting (or rotational) motion of each channel micromirror be individually controllable in an analog manner, whereby the pivoting angle can be continuously adjusted so as to enable the channel micromirror to scan a spectral channel across all possible output ports. The underlying fabrication techniques for micromachined mirrors and associated actuation mechanisms are well documented in the art, see U.S. Pat. No. 5,629,790 for example. Moreover, a fiber collimator is typically in the form of a collimating lens (such as a GRIN lens) and a ferrule-mounted fiber packaged together in a mechanically rigid (stainless steel or glass) tube. The fiber collimators serving as the input and output ports may be arranged in a one-dimensional array, a two-dimensional array, or other desired spatial pattern. For instance, they may be conveniently mounted in a linear array along a V-groove fabricated on a substrate made of silicon, plastic, or ceramic, as commonly practiced in the art. It should be noted, however, that the input port and the output ports need not necessarily be in close spatial proximity with each other, such as in an array configuration, although close packing would reduce the rotational range required for each channel micromirror. Those skilled in the art will know how to design a WSR apparatus according to the invention, to best suit a given application.

Figure 2A:
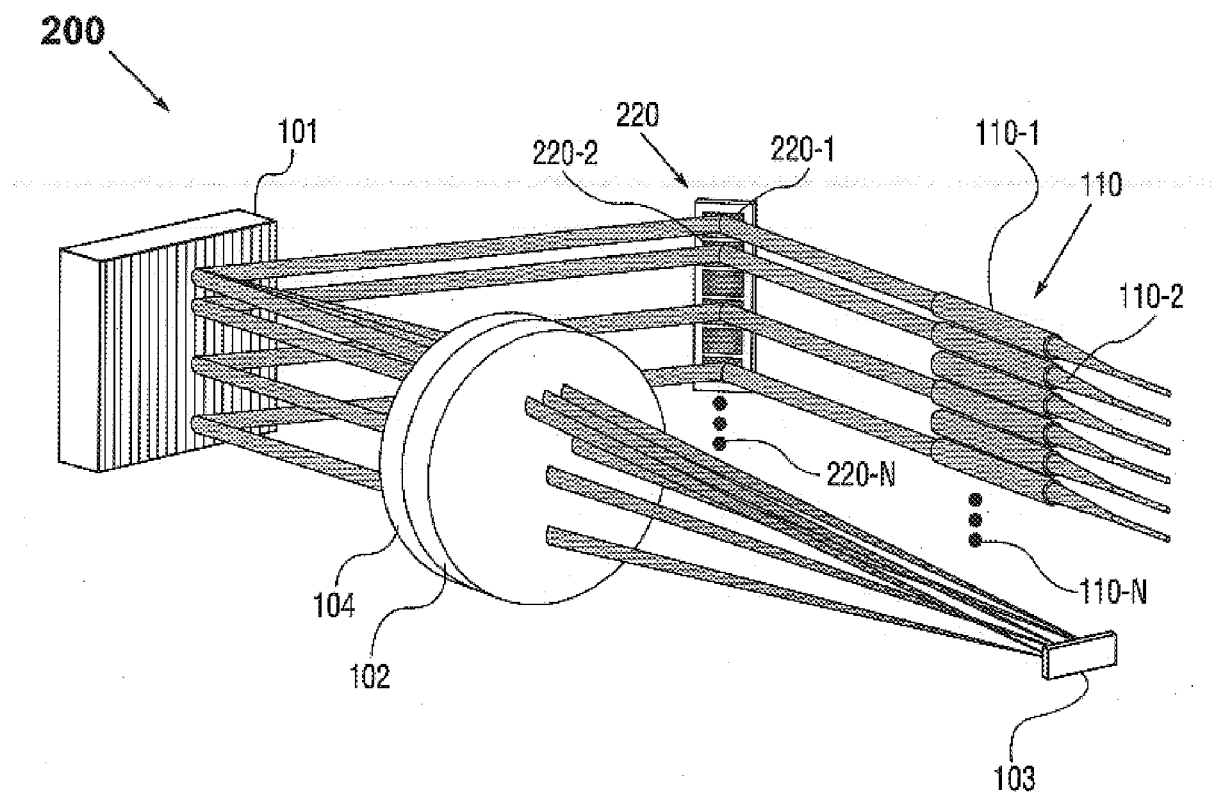
FIG. 2A depicts a second embodiment of a WSR apparatus with which the invention may be employed.
Figure 2B:
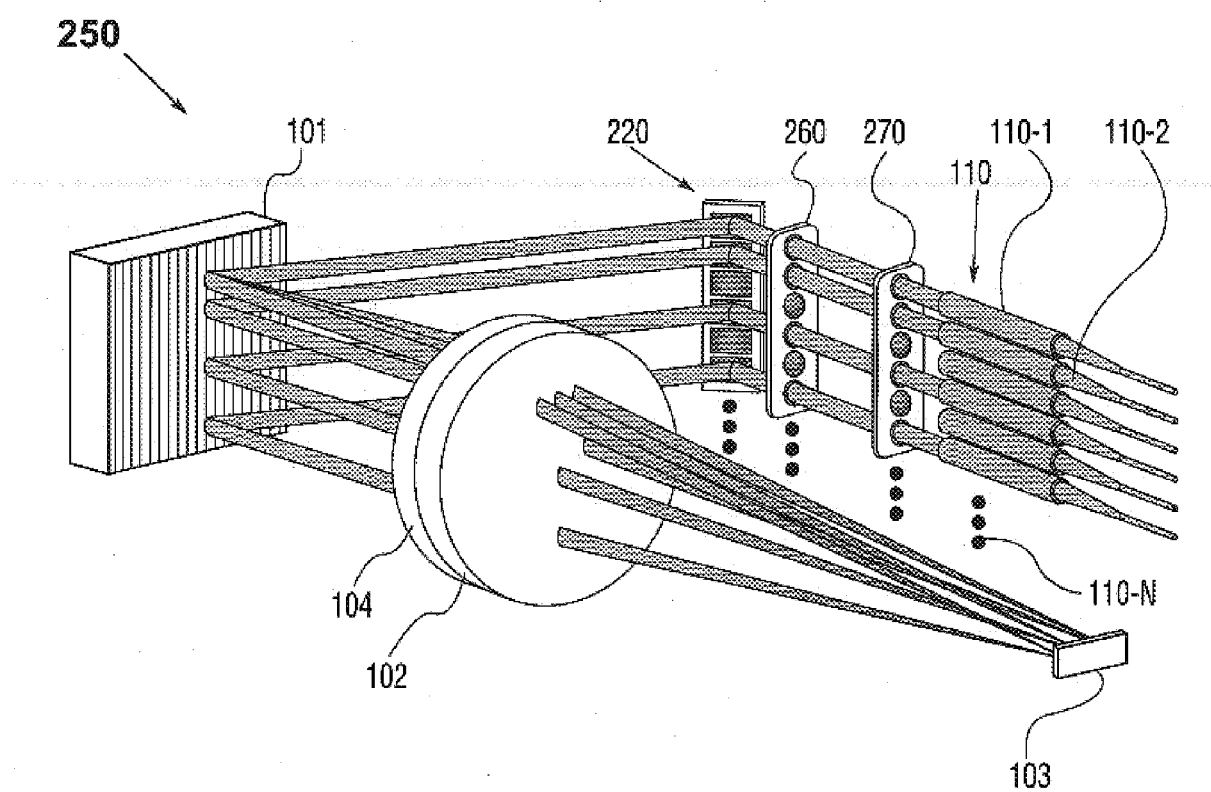
FIGS. 2B–2C show a third embodiment of a WSR apparatus with which the invention may be employed.
Figure 3:
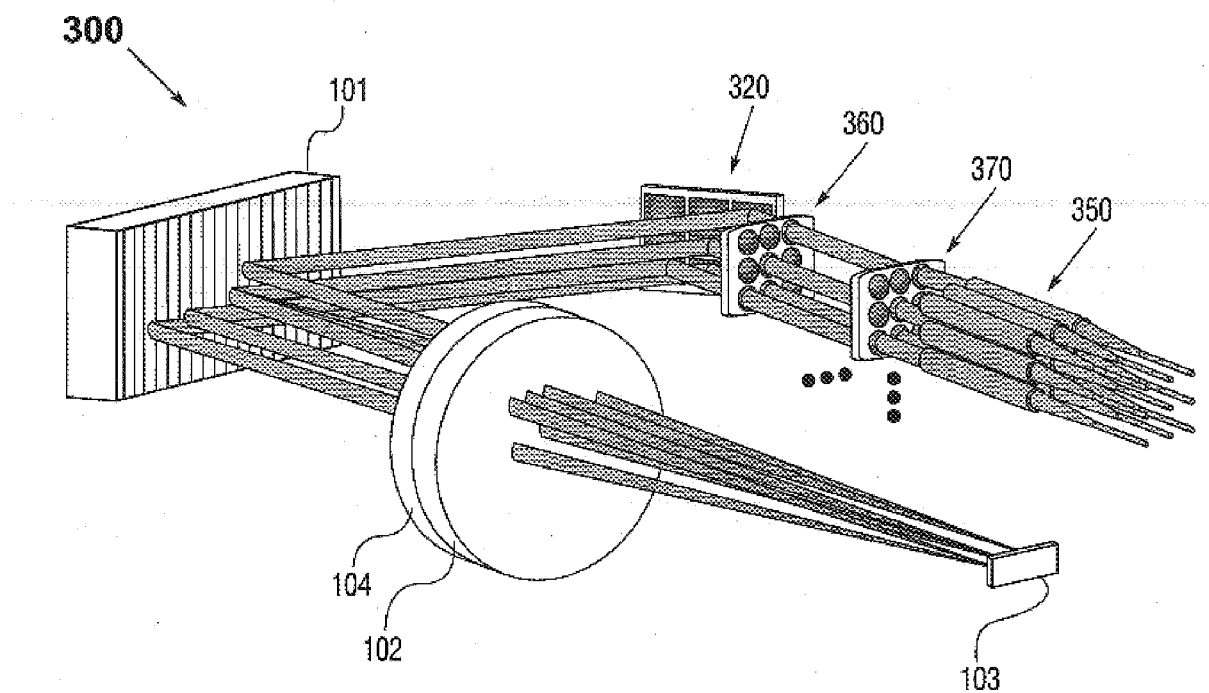
FIG. 3 shows a fourth embodiment of a WSR apparatus with which the invention may be employed.

A WSR apparatus embodying the invention may further comprise an array of collimator-alignment mirrors, for adjusting the alignment of the input multi-wavelength optical signal and facilitating the coupling of the spectral channels into the respective output ports, as shown in FIGS. 2A–2B and 3.

FIG. 2A depicts a second embodiment of a WSR with which the invention may be used. By way of example, WSR apparatus 200 is built upon and hence shares a number of the elements used in the embodiment of FIG. 1A, as identified by those elements labeled with identical numerals. Moreover, a one-dimensional array 220 of collimator-alignment mirrors 220-1 through 220-N is optically interposed between the diffraction grating 101 and the fiber collimator array 110. The collimator-alignment mirror 220-1 is designated to correspond with the input port 110-1, for adjusting the alignment of the input multi-wavelength optical signal and therefore ensuring that the spectral channels impinge onto the corresponding channel micromirrors. The collimator-alignment mirrors 220-2 through 220-N are designated to the output ports 110-2 through 110-N in a one-to-one correspondence, serving to provide angular control of the collimated beams of the reflected spectral channels and thereby facilitating the coupling of the spectral channels into the respective output ports according to desired coupling efficiencies. Each collimator-alignment mirror may be rotatable about one axis, or two axes.

Figure 2C:
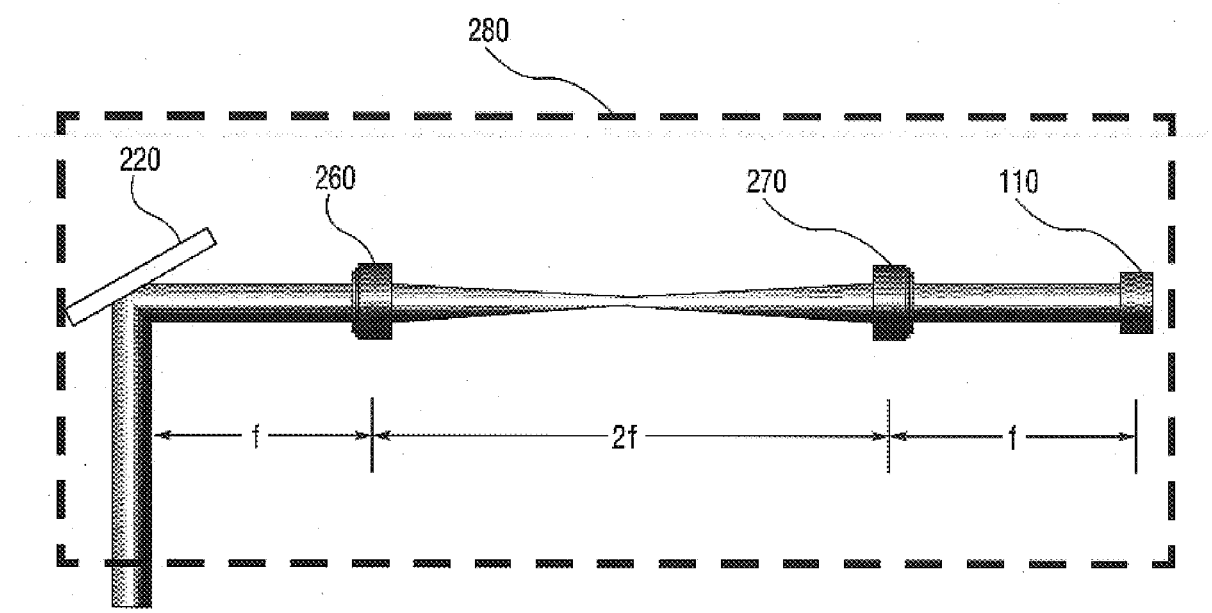

The embodiment of FIG. 2A is attractive in applications where the fiber collimators (serving as the input and output ports) are desired to be placed in close proximity to the collimator-alignment mirror array 220. To best facilitate the coupling of the spectral channels into the output ports, arrays of imaging lenses may be implemented between the collimator-alignment mirror array 220 and the fiber collimator array 110, as depicted in FIG. 2B. By way of example, WSR apparatus 250 of FIG. 2B is built upon and hence shares many of the elements used in the embodiment of FIG. 2A, as identified by those elements labeled with identical numerals. Additionally, first and second arrays 260, 270 of imaging lenses are placed in a 4-f telecentric arrangement with respect to the collimator-alignment mirror array 220 and the fiber collimator array 110. The dashed box 280 shown in FIG. 2C provides a top view of such a telecentric arrangement. In this case, the imaging lenses in the first and second arrays 260, 270 all have the same focal length f. The collimator-alignment mirrors 220-1 through 220-N are placed at the respective first (or front) focal points of the imaging lenses in the first array 260. Likewise, the fiber collimators 110-1 through 110-N are placed at the respective second (or back) focal points of the imaging lenses in the second array 270. The separation between the first and second arrays 260, 270 of imaging lenses is 2f. In this way, the collimator-alignment mirrors 220-1 through 220-N are effectively imaged onto the respective entrance surfaces (i.e., the front focal planes) of the GRIN lenses in the corresponding fiber collimators 110-1 through 110-N. Such a 4-f relay (or imaging) system substantially eliminates translational walk-off of the collimated beams at the output ports that may otherwise occur as the mirror angles change.

FIG. 3 shows a fourth embodiment of a WSR apparatus with which the invention may be used. By way of example, WSR apparatus 300 is built upon and hence shares a number of the elements used in the embodiment of FIG. 2B, as identified by those elements labeled with identical numerals. In this case, the one-dimensional fiber collimator array 110 of FIG. 2B is replaced by a two-dimensional array 350 of fiber collimators, providing for an input-port and a plurality of output ports. Accordingly, the one-dimensional collimator-alignment mirror array 220 of FIG. 2B is replaced by a two-dimensional array 320 of collimator-alignment mirrors, and first and second one-dimensional arrays 260, 270 of imaging lenses of FIG. 2B are likewise replaced by first and second two-dimensional arrays 360, 370 of imagining lenses respectively. As in the case of the embodiment of FIG. 2B, the first and second two-dimensional arrays 360, 370 of imaging lenses are placed in a 4-f relay (or imaging) arrangement with respect to the two-dimensional collimator-alignment mirror array 320 and the two-dimensional fiber collimator array 350. Each of the channel micromirrors 103 must be pivotable biaxially in this case (in order to direct its corresponding spectral channel to any one of the output ports). As such, the WSR apparatus 300 is equipped to support a greater number of the output ports.

In addition to facilitating the coupling of the spectral channels into the respective output ports as described above, the collimator-alignment mirrors in the above embodiments also serve to compensate for misalignment, e.g., due to fabrication and assembly errors, in the fiber collimators that provide for the input and output ports. For instance, relative misalignment between the fiber cores and their respective collimating lenses in the fiber collimators can lead to pointing errors in the collimated beams, which may be corrected for by the collimator-alignment mirrors. For these reasons, the collimator-alignment mirrors are preferably rotatable about two axes. They may be silicon micromachined mirrors, for fast rotational speeds. They may also be other types of mirrors or beam-deflecting elements known in the art.

To optimize the coupling of the spectral channels into the output ports and further maintain the optimal optical alignment against environmental effects such as temperature variations and mechanical instabilities over the course of operation, a WSR apparatus of the invention may incorporate a servo-control assembly, for providing dynamic control of the coupling of the spectral channels into the respective output ports on a channel-by-channel basis. A WSR apparatus incorporating a servo-control assembly is termed a WSR-S apparatus within this specification.

Figure 4A:
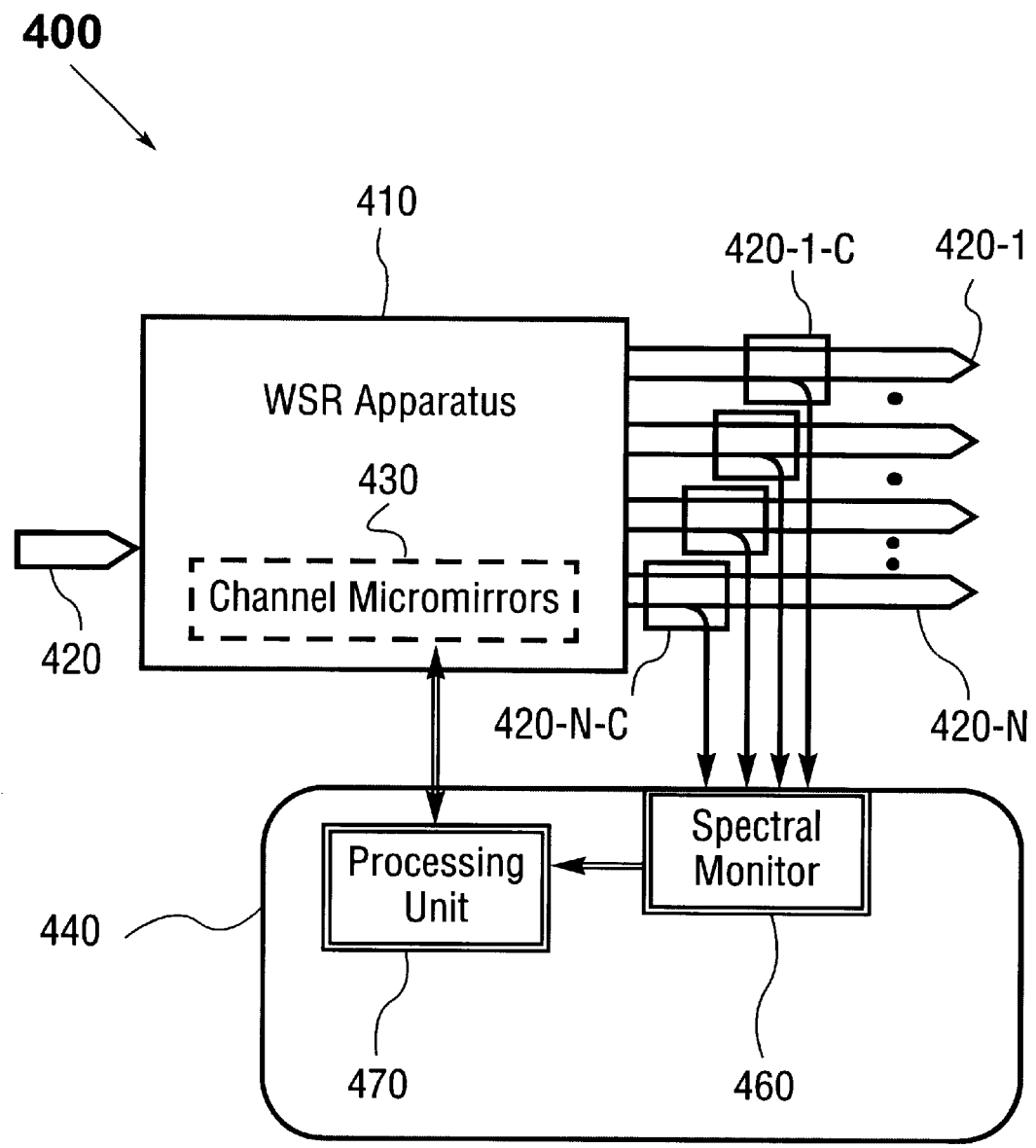
FIGS. 4A–4B show schematic illustrations of two embodiments of a WSR-S apparatus comprising a WSR apparatus and a servo-control assembly, according to the invention.

FIG. 4A depicts a schematic illustration of a first embodiment of a WSR-S apparatus according to the invention. The WSR-S apparatus 400 comprises a WSR apparatus 410 and a servo-control assembly 440. The WSR 410 may be substantially identical to the apparatus 100 of FIG. 1A, or any other embodiment in accordance with the invention. The servo-control assembly 440 includes a spectral monitor 460, for monitoring the optical power levels of the spectral channels coupled into the output ports 420-1 through 420-N of the WSR apparatus 410. By way of example, the spectral monitor 460 is coupled to the output ports 420-1 through 420-N by way of fiber-optic couplers 420-1-C through 420-N-C, wherein each fiber-optic coupler serves to "tap off" a predetermined fraction of the optical signal in the corresponding output port. The servo-control assembly 440 further includes a processing unit 470, in communication with the spectral monitor 460 and the channel micromirrors 430 of the WSR apparatus 410. The processing unit 470 uses the optical power measurements from the spectral monitor 460 to provide feedback control of the channel micromirrors 430 on an individual basis, so as to maintain a desired coupling efficiency for each spectral channel into a selected output port. As such, the servo-control assembly 440 provides dynamic control of the coupling of the spectral channels into the respective output ports on a channel-by-channel basis and thereby manages the optical power levels of the spectral channels coupled into the output ports. The optical power levels of the spectral channels in the output ports may be dynamically managed according to demand, or maintained at desired values, e.g., equalized at a predetermined value, in the invention. Such a spectral power-management capability is essential in WDM optical networking applications, as discussed above.

Figure 4B:
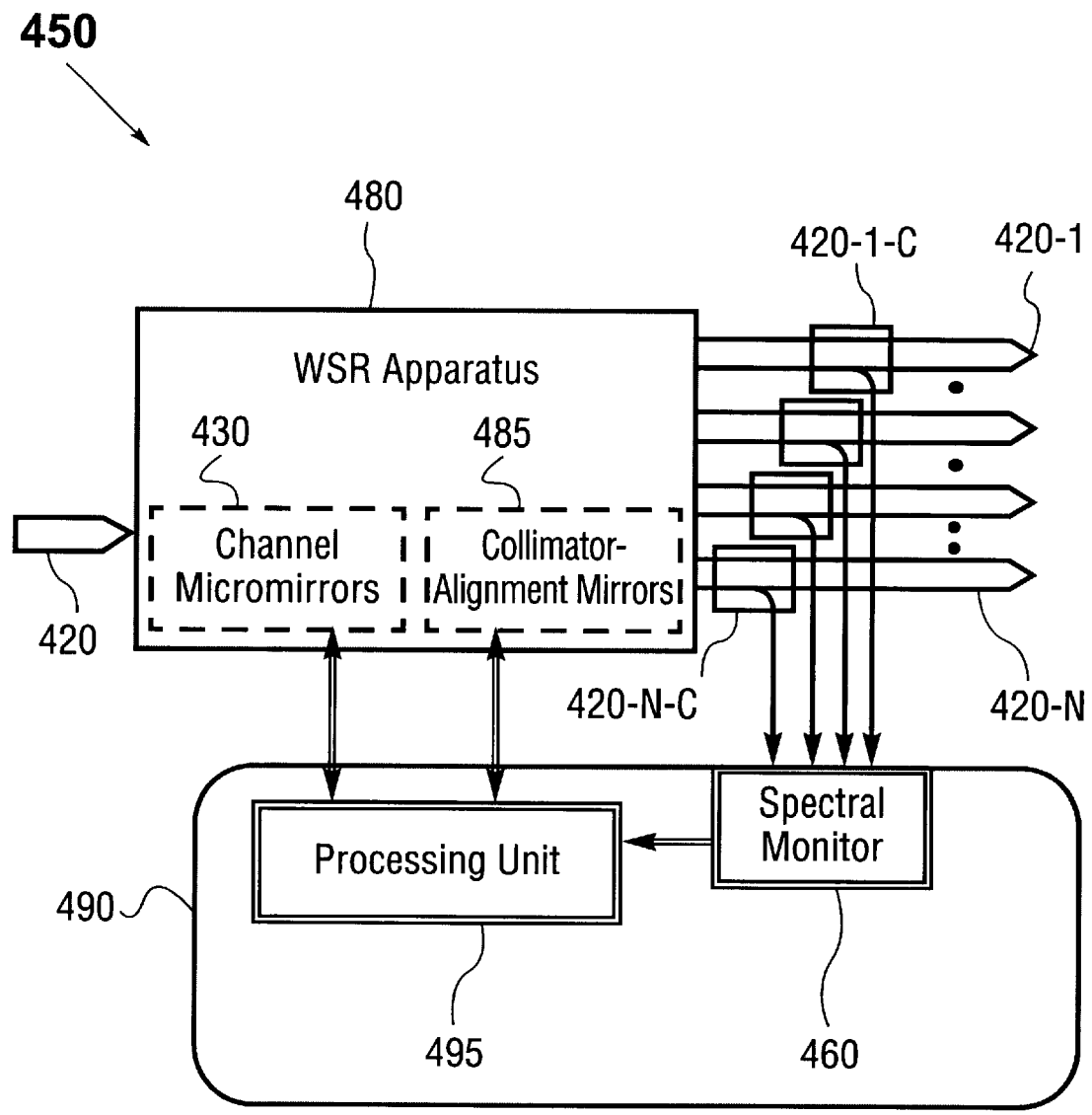

FIG. 4B depicts a schematic illustration of a second embodiment of a WSR-S apparatus according to the invention. The WSR-S apparatus 450 comprises a WSR apparatus 480 and a servo-control assembly 490. In addition to the channel micromirrors 430 (and other elements identified by the same numerals as those used in FIG. 4A), the WSR apparatus 480 further includes a plurality of collimator-alignment mirrors 485, and may be configured according to the embodiment of FIGS. 2A, 2B, 3, or any other embodiment in accordance with the invention. By way of example, the servo-control assembly 490 includes the spectral monitor 460 as described in the embodiment of FIG. 4A, and a processing unit 495. In this case, the processing unit 495 is in communication with the channel micromirrors 430 and the collimator-alignment mirrors 485 of the WSR apparatus 480, as well as the spectral monitor 460. The processing unit 495 uses the optical power measurements from the spectral monitor 460 to provide dynamic control of the channel micromirrors 430 along with the collimator-alignment mirrors 485, so as to maintain the coupling efficiencies of the spectral channels into the output ports at desired values.

In the embodiment of FIG. 4A or 4B, the spectral monitor 460 may be any one of the spectral power monitoring devices known in the art that is capable of detecting the optical power levels of spectral components in a multi-wavelength optical signal. Such devices are typically in the form of a wavelength-separating means, e.g., a diffraction grating, that spatially separates a multi-wavelength optical signal by wavelength into constituent spectral components, and one or more optical sensors, e.g., an array of photodiodes, that are configured such to detect the optical power levels of these spectral components. The processing unit 470 in FIG. 4A (or the processing unit 495 in FIG. 4B) typically includes electrical circuits and signal processing programs for processing the optical power measurements received from the spectral monitor 460 and generating appropriate control signals to be applied to the channel micromirrors 430 (and the collimator-alignment mirrors 485 in the case of FIG. 4B), so as to maintain the coupling efficiencies of the spectral channels into the output ports at desired values. The electronic circuitry and the associated signal processing algorithm/software for a processing unit in a servo-control system are known in the art. A skilled artisan would know how to implement a suitable spectral monitor along with an appropriate processing unit to provide a servo-control assembly in a WSP-S apparatus according to the invention, for a given application.

The incorporation of a servo-control assembly provides additional advantages of effectively relaxing the requisite fabrication tolerances and the precision of optical alignment during initial assembly of a WSR apparatus of the invention, and further enabling the system to correct for shift in the alignment over the course of operation. By maintaining an optimal optical alignment, the optical losses incurred by the spectral channels are also significantly reduced. As such, the WSR-S apparatus thus constructed is simpler and more adaptable in structure, more robust in performance, and lower in cost and optical loss. Accordingly, the WSR-S (or WSR) apparatus of the invention may be used to construct a variety of optical devices and utilized in many applications. Moreover, a novel class of optical add-drop multiplexers (OADMs) may be built upon the WSR-S (or WSR) apparatus of the invention, as exemplified in the following embodiments.

Figure 5:
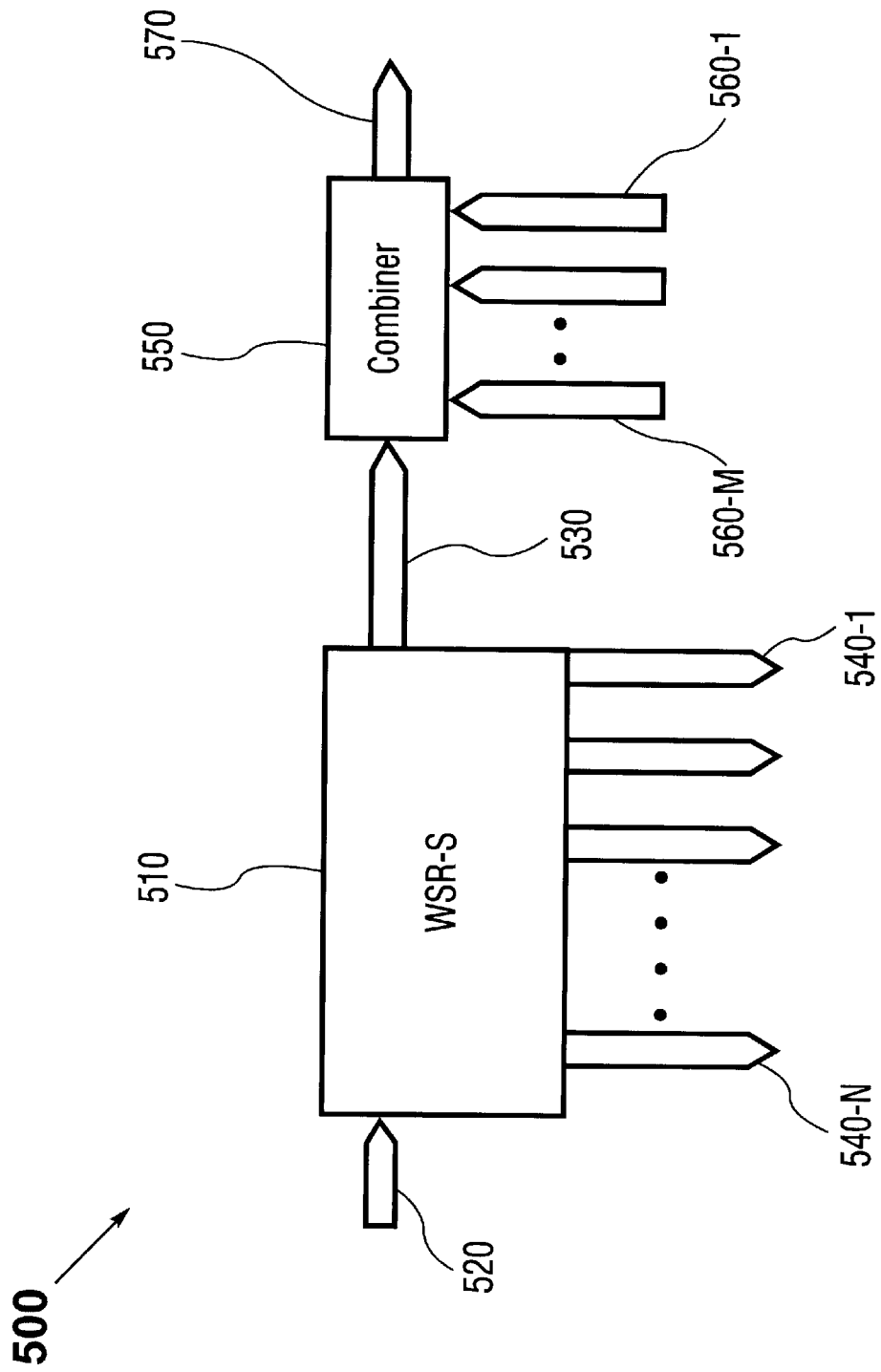
FIG. 5 depicts an exemplary embodiment of an optical add-drop multiplexer (OADM) according to the invention.

FIG. 5 depicts an exemplary embodiment of an optical add-drop multiplexer (OADM) according to the invention. By way of example, OADM 500 comprises a WSR-S (or WSR) apparatus 510 and an optical combiner 550. An input port 520 of the WSR-S apparatus 510 receives a multi-wavelength optical signal. The constituent spectral channels of this optical signal are subsequently separated and routed into a plurality of output ports, including a pass-through port 530 and one or more drop ports 540-1 through 540-N ($N \geq 1$). The pass-through port 530 may receive any number of the spectral channels, i.e., the pass-through spectral channels. Each drop port may also receive any number of the spectral channels, i.e., the drop spectral channels. The pass-through port 530 is optically coupled to the optical combiner 550, which serves to combine the pass-through spectral channels with one or more add spectral channels provided by one or more add ports 560-1 through 560-M (M≧1). The combined optical signal is then routed into an existing port 570, providing an output multi-wavelength optical signal.

In the above embodiment, the optical combiner 550 may be a K×1 (K ≧2) broadband fiber-optic coupler, wherein there are K input-ends and one output-end. The pass-through spectral channels and the add spectral channels are fed into the K input-ends, e.g., in a one-to-one correspondence, and the combined optical signal exits from the output-end of the K×1 fiber-optic coupler as the output multi-wavelength optical signal of the system. Such a multiple-input coupler also serves the purpose of multiplexing a multiplicity of add spectral channels to be coupled into the OADM 500. If the optical power levels of the spectral channels in the output multi-wavelength optical signal are desired to be actively managed, such as being equalized at a predetermined value, two spectral monitors may be utilized. As a way of example, the first spectral monitor may receive optical signals tapped off from the pass-through port 530 and the drop ports 540-1 through 540-N, e.g., by way of fiber-optic couplers as depicted in FIG. 4A or 4B. The second spectral monitor receives optical signals tapped off from the exiting port 570. A servo-control system may be constructed accordingly for monitoring and controlling the pass-through, drop and add spectral channels. As such, the embodiment of FIG. 5 provides a versatile optical add-drop multiplexer in a simple and low-cost assembly, while providing multiple physically separate drop/add ports in a dynamically reconfigurable fashion.

Figure 6:
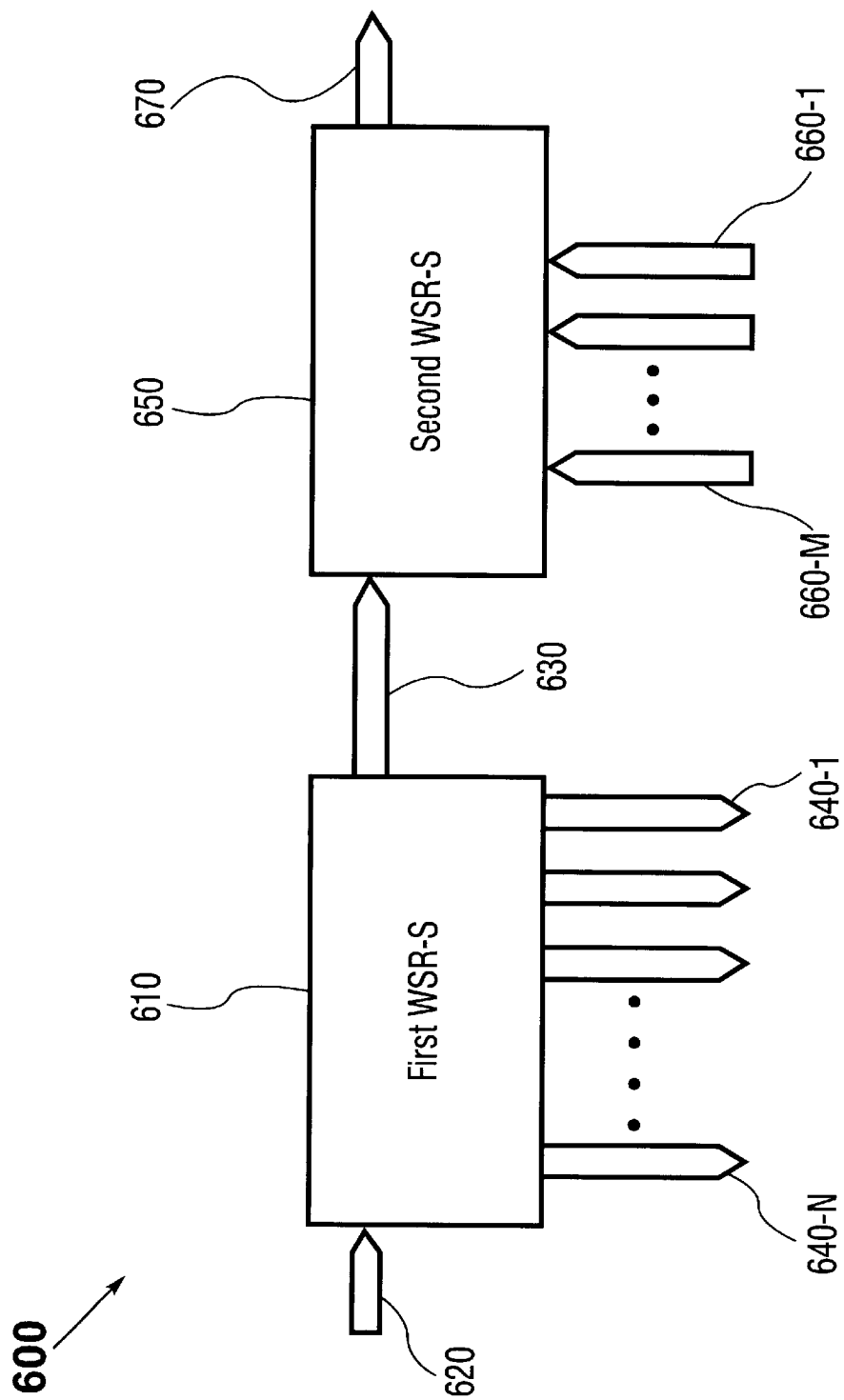
FIG. 6 shows an alternative embodiment of an OADM according to the invention.

FIG. 6 depicts an alternative embodiment of an optical add-drop multiplexer (OADM) according to the invention. By way of example, OADM 600 comprises a first WSR-S apparatus 610 optically coupled to a second WSR-S apparatus 650. Each WSR-S apparatus may be substantially identical to the embodiment of FIG. 4A or 4B. (A WSR apparatus of the embodiment of FIG. 1A, 2A, 2B, or 3 may be alternatively implemented.) The first WSR-S apparatus 610 includes an input port 620, a pass-through port 630, and one or more drop ports 640-1 through 640-N (N≧1). The pass-through spectral channels from the pass-through port 630 are further coupled to the second WSR-S apparatus 650, along with one or more add spectral channels emerging from add ports 660-1 through 660-M (M≧1). In this exemplary case, the pass-through port 630 and the add ports 660-1 through 660-M constitute the input ports for the second WSR-S apparatus 650. By way of its constituent wavelength-separator, e.g., a diffraction grating, and channel micromirrors (not shown in FIG. 6), the second WSR-S apparatus 650 serves to multiplex the pass-through spectral channels and the add spectral channels, and route the multiplexed optical signal into an exiting port 670 to provide an output signal of the system.

In the embodiment of FIG. 6, one WSR-S apparatus, e.g., the first WSR-S apparatus 610, effectively performs dynamic drop function, whereas the other WSR-S apparatus (e.g., the second WSR-S apparatus 650) carries out dynamic add function. And there are essentially no fundamental restrictions on the wavelengths that can be added or dropped (other than those imposed by the overall communication system). Moreover, the underlying OADM architecture thus presented is intrinsically scalable and can be readily extended to any number of cascaded WSR-S (or WSR) systems, if so desired for performing intricate add and drop functions. Additionally, the OADM of FIG. 6 may be operated in reverse direction, by using the input ports as the output ports, the drop ports as the add ports, and vice versa.

As discussed above, the diffraction efficiency of a diffraction grating is polarization-sensitive, and such polarization-sensitive effects may give rise to significant insertion loss and polarization-dependent loss (PDL) in an optical system. The situation is further exacerbated in WDM optical networking applications, where the polarization state of WDM signals is typically indeterminate and may vary with time. This can produce an undesirable time-varying insertion loss that may cause the optical signals to fall below acceptable levels or render them unusable. Thus, it is desirable to avoid such polarization-sensitive effects, and the invention affords a polarization diversity scheme that addresses this, as will now be described.

Figure 7A:
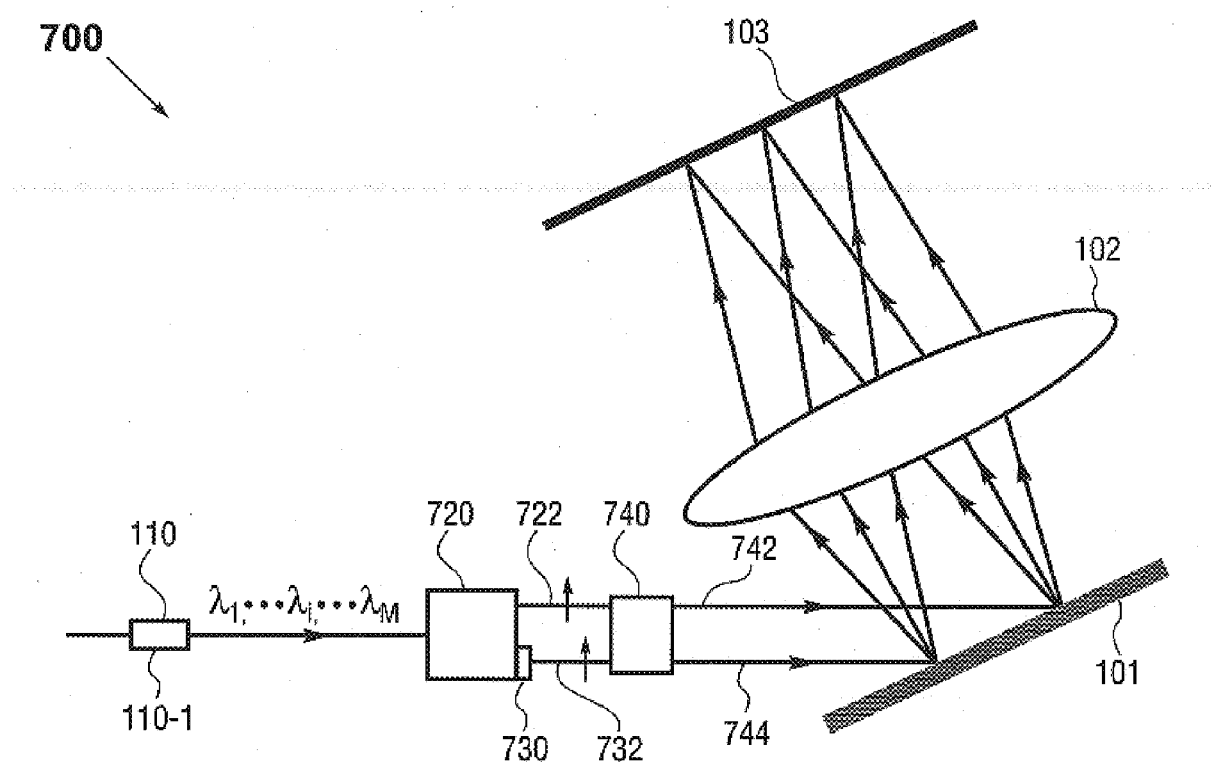
FIGS. 7A–7B depict a fifth embodiment of a WSR apparatus according to the invention employing a polarization diversity arrangement.
Figure 7B:
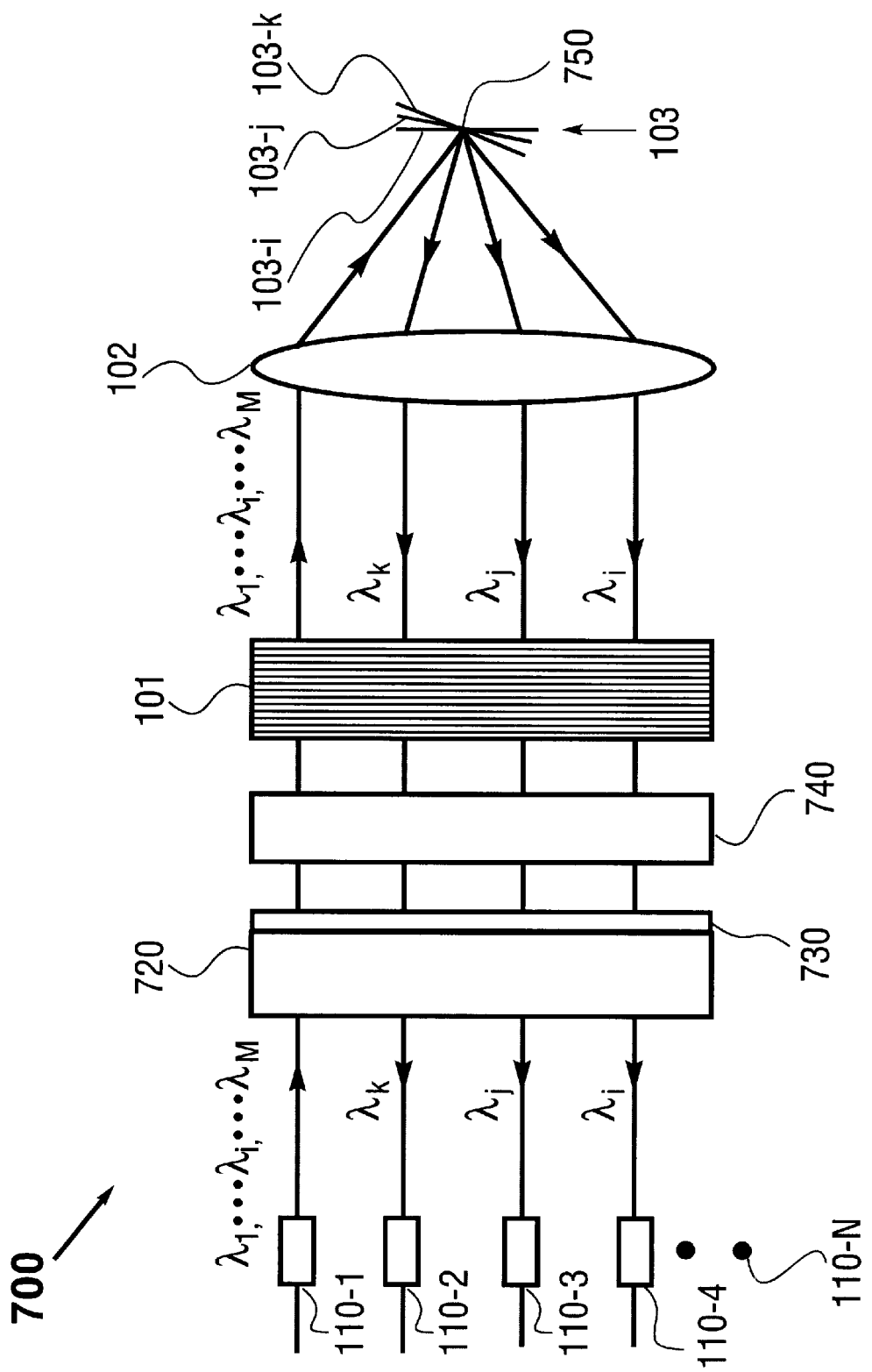

FIG. 7A depicts a schematic top view and FIG. 7B depicts a schematic side view of a fifth embodiment of a WSR apparatus of the invention that employs a polarization diversity arrangement that minimizes polarization-sensitive effects. (The schematic top and side views in FIGS. 7A–7B and the following figures are presented with respect to the perspective view of FIG. 1A.) WSR apparatus 700 may make use of the general architecture and a number of the elements used in the embodiment of FIG. 1A, as indicated by those elements labeled with the same numerals. The input port 110-1 provides a multi-wavelength optical signal, which may be of indeterminate time varying polarization and which may contain wavelengths $\lambda_1$ through $\lambda_M$, for instance, to a polarization-displacing unit 720. The polarization-displacing unit may be disposed along the optical path between the array of fiber collimators 110 (including the input port 110-1 and the output ports 110-2 through 110-N, as shown in FIG. 7B below) and the diffraction grating 101. The polarization-displacing unit 720 serves to separate or decompose the input multi-wavelength optical signal into a first p-polarization component and a second orthogonal s-polarization component. Assuming that p-polarization is the "preferred" polarization direction of the diffraction grating 101, i.e., the diffraction efficiency is higher for the p-polarization component than for the s-polarization component, the p-polarization component of the input optical signal may be output as a first optical signal 722 from the polarization displacing unit. The second s-polarization component of the input optical signal may be rotated by 90-degrees, by a polarization-rotating unit 730 to produce a second optical signal 732 also having p-polarization. Thus, the two optical signals 722, 732 incident onto the diffraction grating 101 both possess p-polarization.

The first and second polarization components (optical signals 722, 732) emerging from the polarization-displacing unit 720 and the polarization-rotating unit 730, respectively, may undergo an anamorphic beam magnification by a beam-modifying unit 740 and emerge as spatially separated and magnified beams 742, 744 which impinge upon the diffraction grating 101. The configuration may be such that the beam-modifying unit 740 preferentially enlarges the beam size in the direction perpendicular to the groove lines on the diffraction grating 101. This magnifies the optical beams in a direction perpendicular to the groove lines of the grating so that the focused beams produced by the focusing lens 102 are narrower in this direction, i.e., perpendicular to the groove lines. This enables use, for example, of rectangular shaped micromirrors. The diffraction grating 101 subsequently separates the magnified first and second polarization components 742, 744 by wavelength into first and second sets of diffracted optical beams. Each set of optical beams comprises multiple wavelengths $\lambda_1$ through $\lambda_M$, which are diffracted by the diffraction grating 101 at different angles.

The focusing lens 102 in turn focuses the diffracted optical beams into corresponding focused spots which impinge onto the channel micromirrors 103. Each focused spot may be elliptical in cross-section. Further, the first and second diffracted optical beams having the same wavelength, e.g., $\lambda_i$, are arranged to impinge onto the same channel micromirror, e.g., the channel micromirror 103-i, see FIG. 7B. In this way, each channel micromirror handles concurrently two optical beams having the same polarization and wavelength.

FIG. 7B depicts a schematic side view of the WSR apparatus 700, where only the second multiple wavelength polarization component 732, 744 (on the forward path), along with the reflected first set of optical beams (on the return path), are shown. For purposes of illustration and clarity, several channel micromirrors are explicitly identified in this figure, while the array of channel micromirrors as a whole is also indicated by the numeral 103. As described above with respect to FIGS. 1A–1B, the channel micromirrors 103 are individually controllable and movable, e.g., pivotable about an axis 750 (which may be parallel to the x-axis shown in FIG. 1B and perpendicular to the plane of FIG. 7B). Hence, each channel micromirror is capable of directing its corresponding optical beams into any one of the output ports 110-2 through 110-N byway of its pivoting motion. By way of example, the channel micromirror 103-k may be controlled to direct the first and second optical beams with wavelength $\lambda_k$ into the first output port 110-2; the channel micromirror 103-j may be controlled to direct the first and second optical beams with wavelength $\lambda_j$ into the second output port 110-3; the channel micromirror 103-i may be controlled to direct the first and second optical beams with wavelength $\lambda_i$ into the third output port 110-4, and so on. Note that a plurality of the channel micromirrors may be individually controlled to direct their corresponding reflected optical beams into the same output port.

Referring to FIG. 7A, the first and second sets of optical beams reflected from the respective channel micromirrors 103 are deflected out of the plane of the figure (as indicated by the side view of FIG. 7B); hence they are not explicitly shown in the top view of FIG. 7A. With reference to FIG. 7B, it will be apparent to those skilled in the art that the reflected first and second sets of optical beams each undergo an anamorphic beam demagnification by way of the beam-modifying unit 740, thereby resuming the beam size of the input optical signal. The reflected first set of optical beams subsequently undergoes a 90-degree polarization rotation by the polarization-rotating unit 730, whereby the reflected first and second sets of optical beams are polarized in two orthogonal directions upon entering the polarization-displacing unit 720. This enables the polarization-displacing unit 720 to recombine the reflected first and second sets of optical beams by wavelength respectively into reflected spectral channels, prior to being coupled into selected ones of the output ports 110-2 through 110-N.

It should be appreciated that the rotation in polarization produced by a polarization-rotating element, e.g., the polarization-rotating unit 730, may have slight variations about a prescribed angle, e.g., 90-degrees, due to imperfections that may exist in a practical system. Such variations, however, will not significantly affect the overall performance of the invention.

Figure 7C:
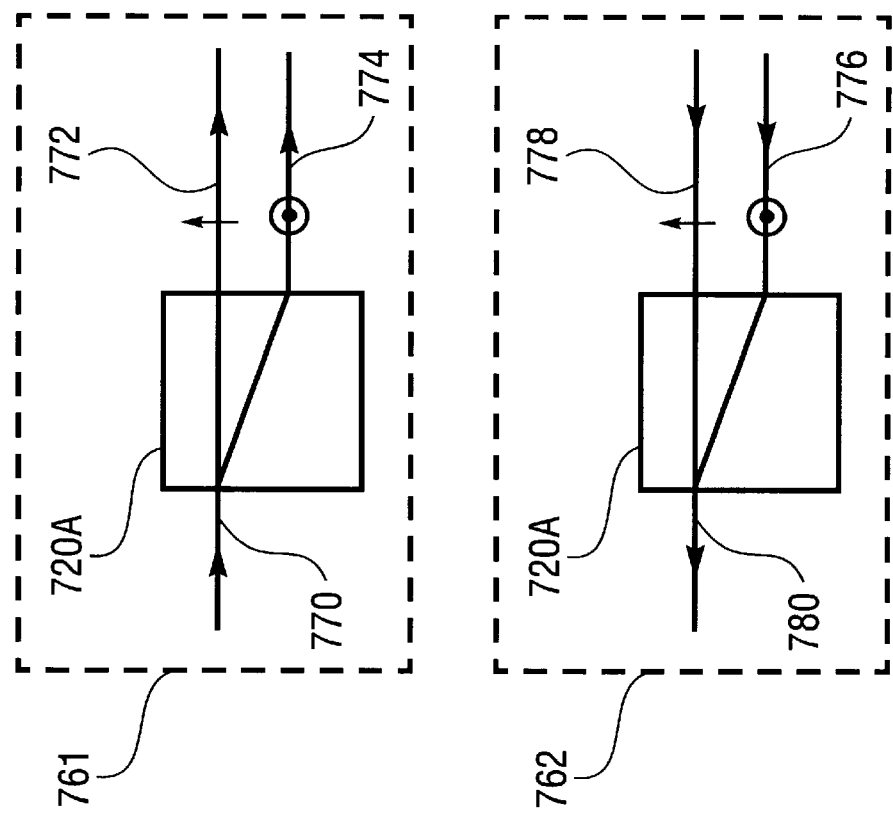

In the embodiment of FIGS. 7A–7B, the polarization-displacing unit 720 may be in the form of a single polarization-displacing element, corresponding to the array of fiber collimators 110. FIG. 7C shows two schematic views of an exemplary embodiment of a polarization-displacing element 720A which may be a birefringent beam displacer well known in the art. The first schematic represented by dashed box 761 of FIG. 7C illustrates a top view of the polarization-displacing element 720A, where an incident optical beam 770, e.g., the multi-wavelength optical signal in the embodiment of FIGS. 7A–7B, is decomposed into first and second polarization components 772, 774 polarized in two orthogonal directions, as illustrated in the figure. Notice that the two polarization components are spatially displaced and propagate in parallel, upon emerging from the polarization-displacing element 720A. The second schematic represented by dashed box 762 of FIG. 7C depicts an exemplary cross-sectional top view of the polarization-displacing element 720A, where two parallel optical beams 776, 778 polarized in two orthogonal directions, e.g., the first and second optical beams associated with wavelength $\lambda_i$ in the embodiment of FIGS. 7A–7B, are recombined by way of traversing the polarization-displacing element 720A into a single optical beam 780, e.g., the reflected spectral channel with wavelength $\lambda_i$ in the embodiment of FIGS. 7A–7B. As such, the polarization-displacing element 720A acts as a polarization-separating element for optical beams propagating in one direction; and serves as a polarization-combining element for optical beams traversing in the opposite direction.

Those skilled in the art will appreciate that rather than using a birefringent beam displacer, the polarization-displacing element 720A may alternatively be provided by a suitable polarizing-beam-splitting element, e.g., a polarizing beam splitter commonly used in the art along with an appropriate beam-deflector or prism (such that the two emerging polarization components propagate in parallel). Such a polarizing-beam-splitting element provides a substantially similar function to the aforementioned birefringent beam displacer. In general, a polarization-displacing element in the invention may be embodied by any optical element that provides a dual function of polarization separating and combining, as depicted in FIG. 7C.

Likewise, the polarization-rotating unit 730 may comprise a single polarization-rotating element, e.g., a half-wave plate, a liquid crystal rotator, a Faraday rotator, or any other means known in the art that is capable of rotating the polarization of an optical beam by a prescribed angle, e.g., 90 degrees.

Alternatively, the polarization-displacing unit 720 may comprise a plurality of polarization-displacing elements, each corresponding to one or more fiber collimators 110 in the embodiment of FIGS. 7A–7B. By way of example, FIG. 7D depicts a schematic side view of a polarization-displacing unit 720B which may be an array of polarization-displacing elements 720-1 through 720-N. Each polarization-displacing element may be a birefringent beam displacer, a polarizing-beam-splitting element, or any other suitable means known in the art, as described above with respect to FIG. 7C. In this case, the polarization-rotating unit 730 may include one or more polarization-rotating elements, each as described above. As a way of example, FIG. 7D also shows a schematic side view of a polarization-rotating unit 730B as an array of polarization-rotating elements 730-1 through 730-N, which may be in a one-to-one correspondence with the polarization-displacing elements 720-1 through 720-N. As such, the polarization-displacing unit 720B, along with the polarization-rotating unit 730B, may be implemented in the embodiment of FIGS. 7A–7B so that the polarization-displacing elements 720-1 through 720-N are in a one-to-one correspondence with the fiber collimators 100 that provide the input port 110-1 and the output ports 110-2 through 110-N.

Those skilled in the art will appreciate that the exemplary embodiments of FIGS. 7C–7D are provided as an example to illustrate how a polarization-displacing unit, along with a polarization-rotating unit, may be configured and operated in the invention. Various changes and modifications may be made in this embodiment to perform the designated functions in a substantially equivalent manner. For example, the polarization-displacing unit 720, along with the polarization-rotating unit 730, may alternatively be configured such that the first and second polarization components are spatially separated along a vertical direction that is substantially perpendicular to the plane of the paper in the schematic top view of FIG. 7A, as opposed to being separated horizontally in a manner as illustrated in FIG. 7A. As will be appreciated from the teachings of the invention, one skilled in the art would know how to implement an appropriate polarization-displacing unit, along with a suitable polarization-rotating unit, in a WSR apparatus, for a given application.

Moreover, the beam-modifying unit 740 may comprise an assembly of cylindrical lenses or prisms, in optical communication with the polarization-displacing unit 720 along with the polarization-rotating unit 730 and the diffraction grating 101. In general, a beam-modifying unit may be embodied by any optical structure that is capable of magnifying the input optical signal and de-magnifying the reflected optical beams according to a predetermined ratio. Such a beam-modifying unit may be particularly useful in applications that call for a refined spectral resolution, such as DWDM optical networking applications.

The WSR apparatus 700 of FIGS. 7A–7B is substantially similar to the WSR apparatus 100 of FIG. 1A in operation and function and hence achieves the advantages thereof. Furthermore, the described polarization diversity approach renders the polarization sensitivity of the diffraction grating 101 inconsequential in the WSR apparatus 700. This enables the WSR apparatus 700 to minimize the insertion loss. It also allows the WSR apparatus 700 to enhance the spectral resolution in a simple and cost-effective construction, e.g., by making use of high-dispersion holographic diffraction gratings commonly available in the art. Another notable feature of the polarization diversity scheme is that the first and second optical beams associated with each wavelength (corresponding to the two polarization components of each spectral channel) effectively "exchange" their respective optical paths, upon reflection from the micromirror, i.e., the return path of the reflected second optical beam is substantially similar to the forward path of the first optical beam, and vice versa. This has the important consequence of substantially equalizing the overall optical paths of the two polarization components for each spectral channel, thereby minimizing the polarization-dependent loss (PDL) and polarization-mode dispersion (PMD). These attributes are desirable in many applications.

Figure 8A:
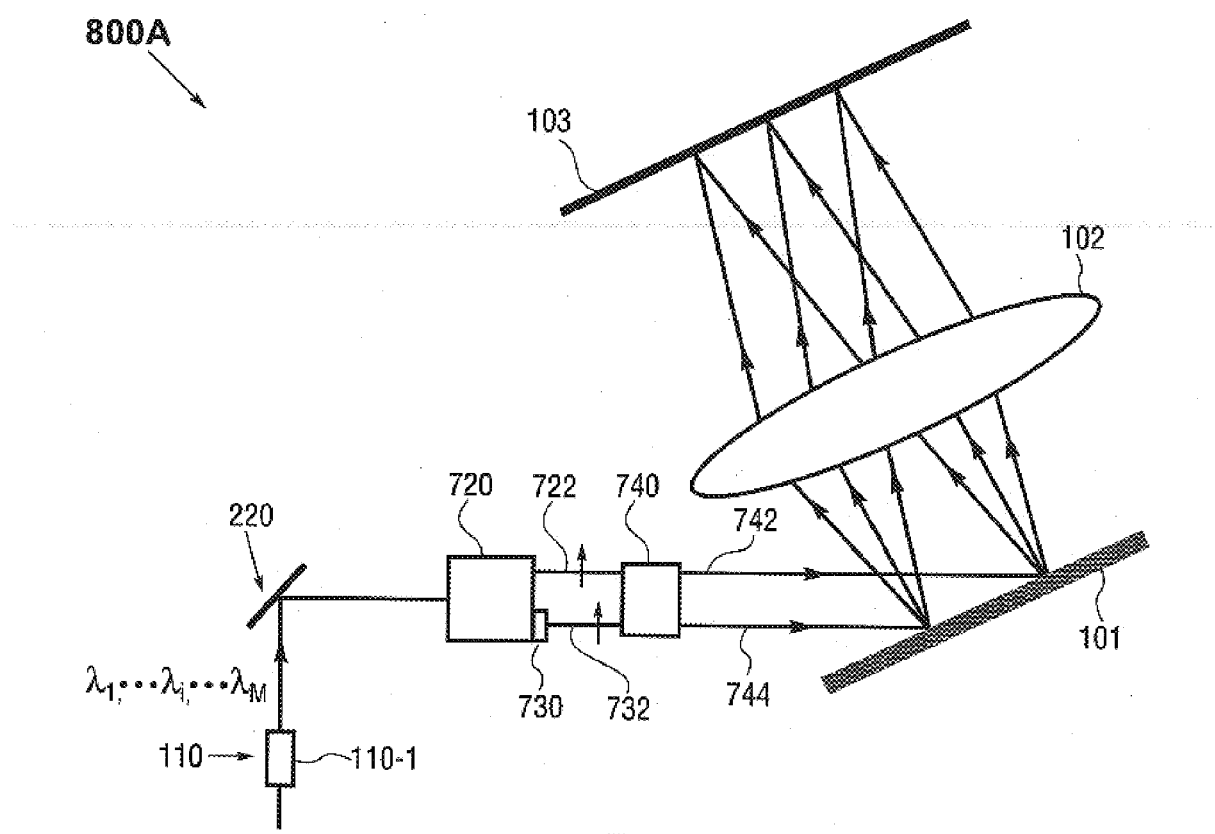
FIG. 8A shows a sixth embodiment of a WSR apparatus according to the invention, employing a polarization diversity arrangement.

Those skilled in the art will appreciate that the WSR apparatus 700 of FIGS. 7A–7B may be further modified in various ways according to the teachings of the invention. For example, the apparatus may include an array of collimator-alignment mirrors such as described with respect to the embodiment of FIG. 2A, 2B, or 3. FIG. 8A shows a schematic top view of a sixth embodiment of a WSR apparatus 800A of the invention which employs an array of collimator-alignment mirrors 220 in a polarization diversity arrangement such as shown in FIGS. 7A–7B. For example, WSR apparatus 800A may be built upon the embodiments of FIGS. 2A and 7A, hence similar elements are labeled with the same numerals. In FIG. 8A, the array of collimator-alignment mirrors 220 (which may include the collimator-alignment mirrors 220-1 through 220-N, as shown in FIG. 2A) may be disposed along the optical path between the fiber collimators 110 and the polarization-displacing unit 720, such that there is a one-to-one correspondence between the collimator-alignment mirrors 220 and the fiber collimators 110 providing the input and output ports. As described with respect to FIG. 2A, the collimator-alignment mirrors 220 may be controlled to adjust the alignment of the input multi-wavelength optical signal and to further provide angular control of the collimated beams of the reflected spectral channels. This facilitates the coupling of the reflected spectral channels into the respective output ports according to desired coupling efficiencies.

Figure 8B:
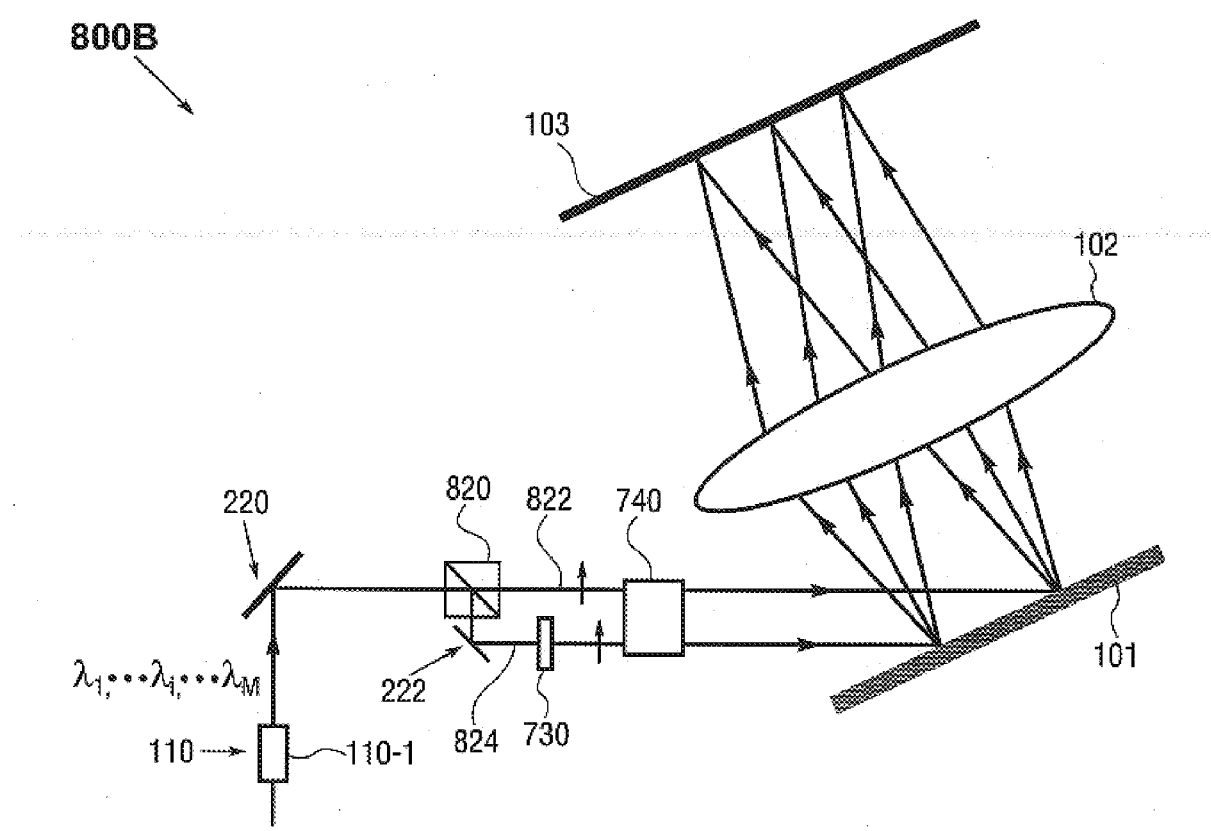
FIG. 8B depicts a seventh embodiment of a WSR apparatus according to the invention employing a polarization diversity arrangement.

In the embodiment of FIG. 8A, the collimator-alignment mirrors 220 are disposed between the fiber collimators 110 and the polarization-displacing unit 720, and control the angular position of the (un-split) multi-wavelength input optical signal as well as the (combined) reflected spectral channels. There may be applications where it is desired to provide separate control to the first and second polarization components (on the forward path), as well as to the reflected first and second sets of optical beams (on the return path). FIG. 8B depicts a schematic top view of a seventh embodiment of a WSR apparatus 800B of the invention, which achieves this. WSR apparatus 800B of FIG. 8B may be built upon the embodiment of FIG. 8A, hence similar elements are labeled with the same numerals. In this case, a polarizing-beam-splitter unit 820 may be employed instead of the polarization-displacing unit 720 of FIG. 8A, to decompose the multi-wavelength input optical signal into first and second polarization components 822, 824 that are propagating in two orthogonal directions. The second polarization component 824 may be subsequently incident onto and reflected by a first beam-deflecting unit 222, whereby it propagates parallel to the first polarization component 822. The operation thereafter is substantially similar to that of FIG. 8A. On the return path, the reflected first set of optical beams is incident onto and reflected by the beam-deflecting unit 222, so as to enable the polarizing-beam-splitter unit 820 to recombine the reflected first and second sets of optical beams by wavelength respectively into reflected spectral channels.

In the embodiment of FIG. 8B, the polarizing-beam-splitter unit 820 may be a single polarizing beam splitter known in the art, in optical communication with the array of fiber collimators 110 via the collimator-alignment mirrors 220. It may also comprise an array of polarizing beam splitters, e.g., in a one-to-one correspondence with the collimator-alignment mirrors 220. The first beam-deflecting unit 222 may comprise an array of first mirrors, e.g., in a one-to-one correspondence with the collimator-alignment mirrors 220. The first mirrors 222 may be individually adjustable, so as to control the relative alignment and thereby ensure the requisite beam parallelism between the first and second polarization components on the forward path, which in turn warrants the first and second optical beams associated with each wavelength substantially coincide on the same channel micromirror. On the return path, the first mirrors 222 may likewise adjust the relative alignment between the reflected first and second sets of optical beams respectively, thereby ensuring that the reflected first and second sets of optical beams are properly recombined into the respective spectral channels by way of the polarizing-beam-splitter unit 820. The first mirrors 222 may be controlled on a dynamic basis. Alternatively, the first mirrors 222 may be adjusted to predetermined positions to enable the polarizing-beam-splitter unit 820 to achieve the requisite beam parallelism. The first mirrors 222 may be subsequently fixed in respective positions over the course of operation. (In this way, the tolerances required for the polarizing-beam-splitter unit 820 may be relaxed.) It should be further appreciated that the first beam-deflecting unit 222 may also be a static mirror, or any other beam-deflecting means known in the art, configured such that the combination of the polarizing-beam-splitter unit 820 and the first beam-deflecting unit 222 effectively constitutes a polarization-displacing unit as described above.

Figure 8C:
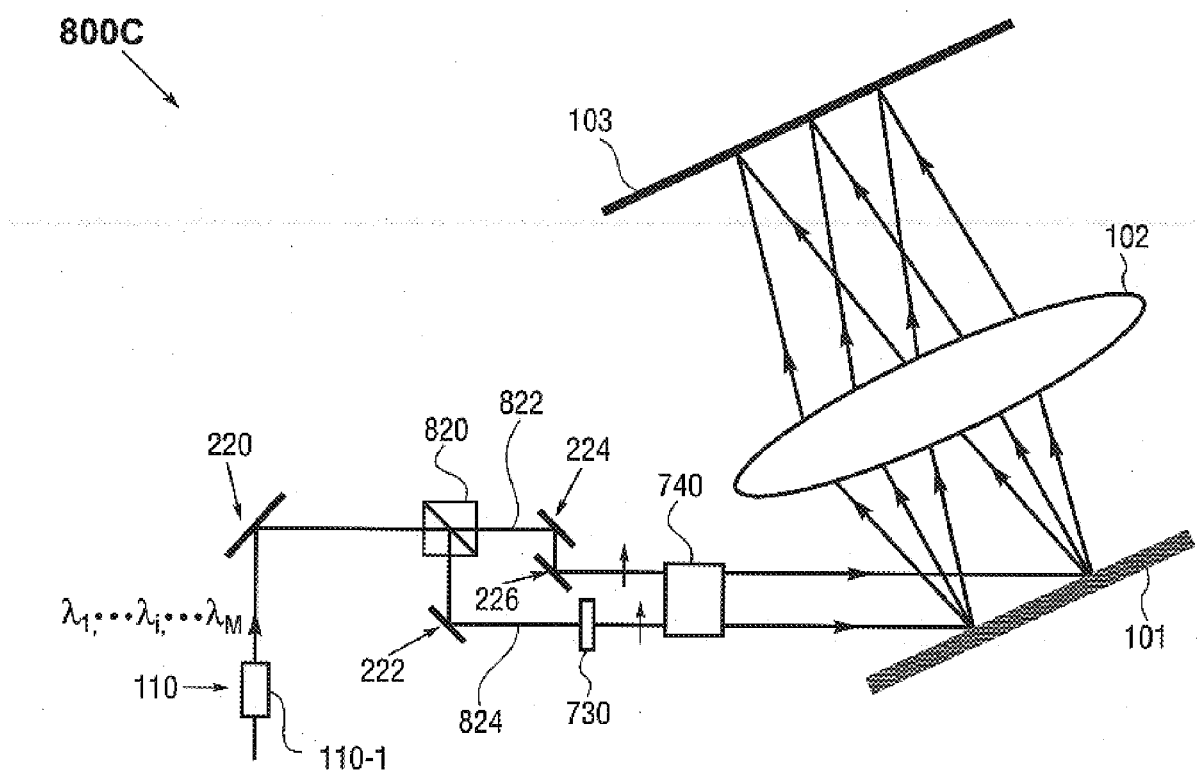
FIG. 8C shows an eighth embodiment of a WSR apparatus according to the invention employing a polarization diversity arrangement.

FIG. 8C depicts a schematic top view of an eighth embodiment of a WSR apparatus 800C of the invention. WSR apparatus 800C may include the elements employed in the embodiment of FIG. 8B, along with second and third beam-deflecting units 224, 226. The second beam-deflecting unit 224 may comprise an array of second mirrors that are individually adjustable, e.g., in a one-to-one correspondence with the first mirrors the first beam-deflecting unit 222 may contain. The third beam-deflecting unit 226 may simply be a static mirror, or other known beam-deflecting device. In this way, the first and second polarization components 822, 824 (on the forward path) may be independently controlled by the first and second beam-deflecting units 222, 224, which may also control the reflected first and second sets of optical beams (on the return path), respectively. The collimator-alignment mirrors 220 may further facilitate the coupling of the (combined) reflected spectral channels into the desired output ports.

The WSR apparatus 700 (or any one of the embodiments of FIGS. 8A–8C) of the invention may further incorporate a servo-control assembly, e.g., in a manner as described with respect to FIG. 4A (or 4B) above. The servo-control assembly may dynamically manage the optical power levels of the reflected spectral channels coupled into the output ports. The servo-control assembly may also be configured such to minimize PDL associated with the spectral channels.

Furthermore, a dynamically reconfigurable OADM may be built upon the WSR apparatus 700, 800A, 800B or 800C (along with an associated servo-control assembly), e.g., in a manner similar to that described with respect to FIG. 5 or 6. The thus-constructed OADMs will have important advantages of low insertion loss, low PDL, and enhanced spectral resolution, which would be particularly suitable for WDM optical networking applications.

Those skilled in the art will recognize that the aforementioned embodiments are provided by way of example to illustrate the general principles of the invention. Various changes, substitutions, and alternations can be made without departing from the principles and the scope of the invention as defined in the appended claims.

What is claimed is:

1. An optical apparatus, comprising:
    fiber collimators providing an input port for a multi-wavelength optical signal and a plurality of output ports;
    a polarization-displacing unit that decomposes said multi-wavelength optical signal into first and second polarization components;
    a polarization-rotating unit that rotates a polarization of the second polarization component to be substantially parallel to a polarization of the first polarization component;
    a wavelength-separator that separates said first and second polarization components by wavelength into first and second sets of optical beams; and
    an array of channel micromirrors positioned to reflect said first and second sets of optical beams such that said reflected first and second sets of optical beams arc recombined by wavelength into reflected spectral channels by said polarization-rotating unit and said polarization-displacing unit;
    wherein said polarization-displacing unit comprises a polarization-displacing element in optical communication with said input port and said output ports, and
    wherein said polarization-rotating unit comprises a polarization-rotating element, in optical communication with said polarization-displacing clement.

2. The optical apparatus of claim 1, wherein said polarization-displacing unit comprises a polarization-displacing element in optical communication with said input port and said output ports.

3. An optical apparatus, comprising:
    fiber collimators providing an input port for a multi-wavelength optical signal and a plurality of output ports;
    a polarization-displacing unit that decomposes said multi-wavelength optical signal into first and second polarization components;
    a polarization-rotating unit that rotates a polarization of the second polarization component to be substantially parallel to a polarization of the first polarization component;
    a wavelength-separator that separates said first and second polarization components by wavelength into first and second sets of optical beams; and
    an array of channel micromirrors positioned to reflect said first and second sets of optical beams such that said reflected first and second sets of optical beams are recombined by wavelength into reflected spectral channels by said polarization-rotating unit and said polarization-displacing unit;
    wherein said polarization-displacing unit comprises a plurality of polarization-displacing elements in correspondence with said input port and said output ports.

4. The optical apparatus of claim 3, wherein said polarization-displacing element comprises an element selected from the group consisting of birefringent beam displacers and polarizing-beam-splitting elements.

5. The optical apparatus of claim 3, wherein said polarization-rotating unit comprises a plurality of polarization-rotating elements in correspondence with said polarization-displacing elements.

6. The optical apparatus of claim 5, wherein each polarization-rotating element comprises an element selected from the group consisting of half-wave plates, Faraday rotators, and liquid crystal rotators.

7. An optical apparatus, comprising:
    fiber collimators providing an input port for a multi-wavelength optical signal and a plurality of output ports;
    a polarization-displacing unit that decomposes said multi-wavelength optical signal into first and second polarization components;
    a polarization-rotating unit that rotates a polarization of the second polarization component to be substantially parallel to a polarization of the first polarization component;
    a wavelength-separator that separates said first and second polarization components by wavelength into first and second sets of optical beams;

an array of channel micromirrors positioned to reflect said first and second sets of optical beams such that said reflected first mid second sets of optical beams are recombined by wavelength into reflected spectral channels by said polarization-rotating unit and said polarization-displacing unit; and a beam-modifying unit for providing anamorphic beam magnification of said first and second polarization components and anamorphic beam demagnification of said reflected first and second sets of optical beams.

8. The optical apparatus of claim 7, wherein beam-modifying unit comprises one or more cylindrical lenses.

9. The optical apparatus of claim 7, wherein beam-modifying unit comprises one or more prisms.

10. An optical apparatus, comprising:

fiber collimators providing an input port for a multi-wavelength optical signal and a plurality of output ports;

a polarization-displacing unit that decomposes said multi-wavelength optical signal into first and second polarization components;

a polarization-rotating unit that rotates a polarization of the second polarization component to be substantially parallel to a polarization of the first polarization component;

a wavelength-separator that separates said first and second polarization components by wavelength into first and second sets of optical beams;

an array of channel micromirrors positioned to reflect said first and second sets of optical beams such that said reflected first and second sets of optical beams are recombined by wavelength into reflected spectral channels by said polarization-rotating unit and said polarization-displacing unit; and an array of collimator-alignment mirrors in optical communication with said fiber collimators and said polarization-displacing unit for adjusting an alignment of said multi-wavelength optical signal from said input port and for directing said reflected spectral channels into said output ports.

11. The optical apparatus of claim 10, wherein each collimator-alignment mirror is rotatable about at least one axis.

12. An optical apparatus, comprising:

fiber collimators providing an input pod for a multi-wavelength optical signal and a plurality of output pods;

a polarization-displacing unit that decomposes said multi-wavelength optical signal into first and second polarization components;

a polarization-rotating unit that rotates a polarization of the second polarization component to be substantially parallel to a polarization of the first polarization component;

a wavelength-separator that separates said first and second polarization components by wavelength into first and second sets of optical beams; and an array of channel micromirrors positioned to reflect said first and second sets of optical beams such that said reflected first and second sets of optical beams are recombined by wavelength into reflected spectral channels by said polarization-rotating unit and said polarization-displacing unit;

wherein said polarization-displacing unit comprises a polarizing beam splitter and a first beam-deflecting unit.

13. The optical apparatus of claim 12, wherein said first beam-deflecting unit comprises an array of first mirrors that are individually adjustable to control positions of said second polarization component and said reflected first set of optical beams.

14. The optical apparatus of claim 13, further comprising a second beam-deflecting unit, in optical communication with said first polarization component and said reflected second set of optical beams, said second beam-deflecting unit comprising an array of second mirrors that are individually adjustable.

15. An optical apparatus, comprising:

fiber collimators providing an input port for a multi-wavelength optical signal and a plurality of output ports;

a polarization-displacing unit that decomposes said multi-wavelength optical signal into first and second polarization components;

a polarization-rotating unit that rotates a polarization of the second polarization component to be substantially parallel to a polarization of the first polarization component;

a wavelength-separator that separates said first and second polarization components by wavelength into first and second sets of optical beams;

an array of channel micromirrors positioned to reflect said first and second sets of optical beams such that said reflected first and second sets of optical beams are recombined by wavelength into reflected spectral channels by said polarization-rotating unit and said polarization-displacing unit; and a servo-control assembly, including a spectral monitor for monitoring optical power lever of said reflected spectral channels and a processing unit responsive to said optical power levels for controlling said channel micromirrors.

16. The optical apparatus of claim 15, wherein said servo-control assembly controls said channel micromirrors to maintain said optical power levels at a predetermined value.

17. An optical apparatus, comprising:

fiber collimators providing an input port for a multi-wavelength optical signal and a plurality of output ports;

a polarization-displacing unit that decomposes said multi-wavelength optical signal into first and second polarization components;

a polarization-rotating unit that rotates a polarization of the second polarization component to be substantially parallel to a polarization of the first polarization component;

a wavelength-separator that separates said first and second polarization components by wavelength into first and second sets of optical beams; and an array of channel micromirrors positioned to reflect said first and second sets of optical beams such that said reflected first and second sets of optical beams are recombined by wavelength into reflected spectral channels by said polarization-rotating unit arid said polarization-displacing unit;

wherein each channel micromirror is pivotable about two axes; and wherein said fiber collimators are arranged in a two-dimensional array.

18. An optical apparatus, comprising:
fiber collimators providing an input port for a multi-wavelength optical signal arid a plurality of output ports;
a polarization-displacing unit that decomposes said multi-wavelength optical signal into first and second polarization components;
a polarization-rotating unit that rotates a polarization of the second polarization component to be substantially parallel to a polarization of the first polarization component;
a wavelength-separator that separates said first and second polarization components by wavelength into first and second sets of optical beams; and
an array of channel micromirrors positioned to reflect said first and second sets of optical beams such that said reflected first and second sets of optical beams arc recombined by wavelength into reflected spectral channels by said polarization-rotating unit and said polarization-displacing unit;
wherein said array of channel micromirrors reflects said first and second sets of optical beams so as to couple said beams into selected output ports.

19. An optical apparatus, comprising:
fiber collimators providing an input pod for a multi-wavelength optical signal and a plurality of output ports;
a polarization-displacing unit that decomposes said multi-wavelength optical signal into first and second polarization components;
a polarization-rotating unit that rotates a polarization of the second polarization component to be substantially parallel to a polarization of the first polarization component; a wavelength-separator that separates said first and second polarization components by wavelength into first and second sets optical beams; and
an array of channel micromirrors positioned to reflect said first and second sets of optical beams such that said reflected first and second sets of optical beams are recombined by wavelength into reflected spectral channels by said polarization-rotating unit and said polarization-displacing unit;
wherein said fiber collimators are arranged in a one-dimensional array.

20. An optical apparatus, comprising:
fiber collimators providing an input port for a multi-wavelength optical signal and a plurality of output ports;
a polarization-displacing unit that decomposes said multi-wavelength optical signal into first and second polarization components;
a polarization-rotating unit that rotates a polarization of the second polarization component to be substantially parallel to a polarization of the first polarization component; a wavelength-separator that separates said first and second polarization components by wavelength into first and second sets of optical beams;
an array of channel micromirrors positioned to reflect said first and second sets of optical beams such that said reflected first and second sets of optical beams are recombined by wavelength into reflected spectral channels by said polarization-rotating unit and said polarization-displacing unit; and
a beam-focuser for focusing said first and second sets of optical beams onto said channel micromirrors.

21. A method of dynamic routing of a multi-wavelength optical signal in a polarization diversity arrangement comprising:
decomposing said multi-wavelength optical signal into first and second polarization components;
providing an anamorphic beam magnification to said first and second polarization components, respectively;
rotating a polarization of said second polarization component to be substantially parallel to a polarization of the first polarization component;
separating said first and second polarization components by wavelength respectively into first and second sets of optical beams;
focusing said first and second sets of optical beams onto an array of micromirrors;
dynamically controlling said micromirrors to reflect said first and second sets of optical beams into selected output ports;
rotating a polarization of said reflected First, set of optical beams by approximately 90-degrees; and
recombining said reflected first and second sets of optical beams by wavelength into reflected spectral channels.

22. The method of claim 21 further comprising the step of monitoring said optical power levels at a predetermined value.

23. A method of dynamic routing of a multi-wavelength optical signal in a polarization diversity arrangement, comprising:
decomposing said multi-wavelength optical signal into first and second polarization components;
rotating a polarization of said second polarization component to be substantially parallel to a polarization of the first polarization component;
separating said first, and second polarization components by wavelength respectively into first and second sets of optical beams;
focusing said first and second sets of optical beams onto an array of micromirrors;
dynamically controlling said micromirrors to reflect said first and second sets of optical beams into selected output ports;
rotating a polarization of said reflected first set of optical beams by approximately 90-degrees;
recombining said reflected first and second sets of optical beams by wavelength into reflected spectral channels
monitoring optical power levels of said reflected spectral channels coupled into said output pods; and
providing Feedback control of said micromirrors.

24. The method of claim 23 further comprising the step of maintaining said optical power levels at a predetermined value.

25. A method of dynamic routing of a multi-wavelength optical signal in a polarization diversity arrangement, comprising:
adjusting an alignment of said multi-wavelength optical signal;
decomposing said multi-wavelength optical signal into first and second polarization components;
rotating a polarization of said second polarization component It) be substantially parallel to a polarization of the first polarization component;
separating said first and second polarization components by wavelength respectively into U) first and second sets of optical beams;

focusing said first and second sets of optical beams onto an array of micromirrors dynamically controlling said micromirrors to reflect said first and second sets of optical beams into selected output ports;

rotating a polarization of said reflected first set of optical beams by approximately 90-degrees; and recombining said reflected first and second sets of optical beams by wavelength into reflected spectral channels.

26. The method of claim 25 further comprising the step of coupling of said reflected spectral channels into selected output ports.

27. A method of dynamic routing of a multi-wavelength optical signal in a polarization diversity arrangement, comprising:

decomposing said multi-wavelength optical signal into first and second polarization components;

adjusting a relative alignment between said first and second polarization components;

rotating a polarization of said second polarization component to be substantially parallel to a polarization of the first polarization component;

separating said first and second polarization components by wavelength respectively into first and second sets of optical beams;

focusing said first and second sets of optical beams onto an array of micromirrors;

dynamically controlling said micromirrors to reflect said first awl second sets of optical beams into selected output pods;

rotating a polarization of said reflected first set of optical beams by approximately 90-degrees; and recombining said reflected first and second sets of optical beams by wavelength into reflected spectral channels.

28. The method of claim 27 further comprising the step of adjusting a relative alignment between said reflected first and second sets of optical beams.

* * * * *